US007440680B2

United States Patent
Koda et al.

(10) Patent No.: US 7,440,680 B2
(45) Date of Patent: Oct. 21, 2008

(54) INFORMATION RECORDING MEDIUM, INFORMATION RECORDING AND/OR REPRODUCING APPARATUS AND METHOD, PROGRAM STORAGE DEVICE AND COMPUTER DATA SIGNAL EMBODIED IN CARRIER WAVE FOR CONTROLLING RECORD OR REPRODUCTION, AND DATA STRUCTURE INCLUDING CONTROL SIGNAL

(75) Inventors: Takeshi Koda, Tokorozawa (JP);
Nobuyuki Takakuwa, Tokorozawa (JP);
Takao Sawabe, Tokorozawa (JP); Tohru Kanegae, Tokorozawa (JP); Masanori Nakahara, Tokorozawa (JP); Yasuko Fukuda, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 1383 days.

(21) Appl. No.: 10/329,769

(22) Filed: Dec. 27, 2002

(65) Prior Publication Data
US 2003/0123845 A1    Jul. 3, 2003

(30) Foreign Application Priority Data
Dec. 28, 2001   (JP) ............................. 2001-401618

(51) Int. Cl.
*H04N 7/26* (2006.01)
(52) U.S. Cl. ..................................... 386/125
(58) Field of Classification Search .................. 386/46, 386/83, 95, 98, 124–126
See application file for complete search history.

(56) References Cited

U.S. PATENT DOCUMENTS

| 6,580,869 B1 | 6/2003 | Ando et al. |
| 2001/0010754 A1* | 8/2001 | Ando et al. ................... 386/65 |

FOREIGN PATENT DOCUMENTS

| JP | 11-220692 | 8/1999 |
| JP | 2000-268537 | 9/2000 |
| JP | 2000-312342 | 11/2000 |
| JP | 2001-128100 | 5/2001 |
| JP | 2003-022658 | 1/2003 |
| WO | WO 00/49803 | 8/2000 |
| WO | WO 00/57421 | 9/2000 |

* cited by examiner

*Primary Examiner*—Thai Tran
*Assistant Examiner*—Mishawn Dunn
(74) *Attorney, Agent, or Firm*—Drinker Biddle & Reath LLP

(57) ABSTRACT

On an information recording medium, an entire stream including a plurality of portion streams, each of which is provided with picture information or audio information constituting a series of content, is multiplexed-and-recorded by a unit of packet. The information recording medium is provided with a file for storing object data, which is constructed by a plurality of packets, each of which stores therein a segment of the picture information or the audio information. The information recording medium is further provided with a file for storing information which defines a reproduction sequence of the object data and a file for storing information which defines a group having a specific relation from among a plurality of the plurality of portion streams.

18 Claims, 20 Drawing Sheets

PAT and PMT of TS #2 OBJECT
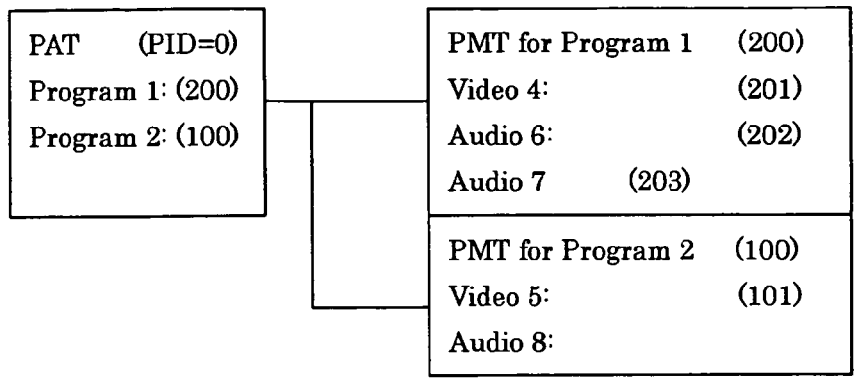
FIG. 18
TS #3 OBJECT
| Program Map PID | Program NO. | Contents of ES | ES_PID |
|---|---|---|---|
| 100 | 1 | Video 6 | 101 |
| | | Audio 9 | 102 |
| | | Audio 10 | 103 |
| | | Sub picture 1 | 104 |
| | | Sub picture 2 | 105 |
FIG. 19
PAT and PMT of TS #3 OBJECT
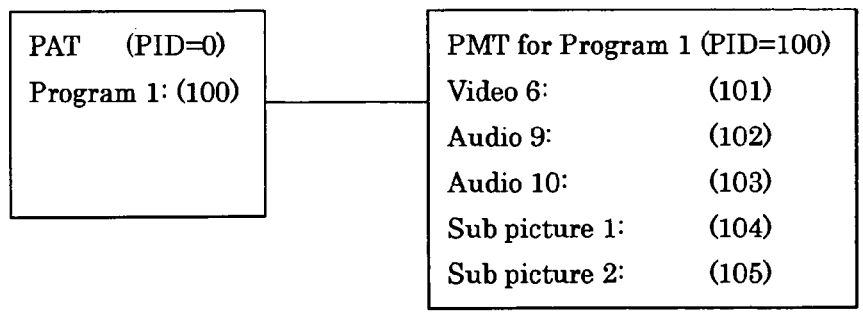
FIG. 20

/100

| DISC | | | |
|---|---|---|---|
| TITLE #1 | | | TITLE #2 |
| P LIST #1 | | | P LIST #2 |
| Item #1 | | Item #2 | Item #1 |
| TS #1 OBJECT | | TS #2 OBJECT | TS #3 OBJECT |
| Vision #1 | Video 1 | Vision# 1 Video 4 | Video 6 |
| | Audio 2 | Audio 7 | Audio 9 |
| Vision #2 | Video 2 | Vision# 2 Video 5 | Audio 10 |
| | Audio 3 | Audio 8 | Sub picture 1 |
| | | | Sub picture 2 |

| FIELD NAME | | DESCRIPTION CONTENTS |
|---|---|---|
| DISC COMPREHENSIVE INFORMATION | | DISC VOLUME INFORMATION, TOTAL TITLE NUMBER etc. |
| TITLE INFO. table | TITLE POINTER | STORING ADDRESS OF TITLE #1 INFO., OTHER INFO. ABOUT TITLE #1, such as TITLE TYPE |
| | | STORING ADDRESS OF TITLE #2 INFO., OTHER INFO. ABOUT TITLE #1, such as TITLE TYPE |
| | | |
| | TITLE#1 INFO. | THE NUMBER OF THE HEAD OF P LISTS OF TITLE #1, OTHER INFO. ABOUT THIS P LIST |
| | | THE NUMBER OF OTHER P LISTS IN TITLE #1, OTHER INFO. ABOUT THIS P LIST |
| | | |
| | TITLE #2 INFO. | THE NUMBER OF THE HEAD OF P LISTS OF TITLE #2, OTHER INFO. ABOUT THIS P LIST |
| | | |
| | | |
| OTHER INFORMATION | | |

114 = FIELD NAME column; 112 = DESCRIPTION CONTENTS column; 118 = OTHER INFORMATION

FIG. 22

TITLE INFORMATION TABLE /114

| FIELD NAME | DESCRIPTION CONTENTS |
|---|---|
| TITLE POINTER | STORING ADDRESS OF TITLE #1 INFO., TITLE TYPE = ONE P LIST TITLE; namely, TOTAL NUMBER OF P LISTS = 1, OTHER INFO. |
| | STORING ADDRESS OF TITLE #2 INFO., TITLE TYPE = ONE P LIST TITLE; namely, TOTAL NUMBER OF P LISTS = 1, OTHER INFO. |
| TITLE #1 INFO. | THE NUMBER OF THE HEAD OF P LISTS = 1, OTHER INFO. ABOUT THIS LIST, such as CHAPTER INFO. |
| TITLE #2 INFO. | THE NUMBER OF THE HEAD OF P LISTS = 2, OTHER INFO. ABOUT THIS LIST, such as CHAPTER INFO. |

FIG. 23

P LIST INFORMATION TABLE 121   122  124

| FIELD NAME | | | DESCRIPTION CONTENTS |
|---|---|---|---|
| P LIST COMPREHENSIVE INFO. | | | P LIST SIZE, TOTAL P LIST NUMBERS etc. |
| P LIST POINTER TABLE | P LIST #1 POINTER | | P LIST #1 INFO. STORING ADDRESS |
| | P LIST #2 POINTER | | P LIST #2 INFO. STORING ADDRESS |
| P LIST #1 INFO. TABLE | P LIST #1 COMPREHENSIVE INFO. | | TOTAL NUMBER OF Items CONSTITUTING P LIST #1 = 2, OTHER INFO. |
| | P LIST #1 Item INFO. TABLE | Item#1 INFO. | RELEVANT AU NUMBER IN AU TABLE IN OBJECT INFO. FILE, etc. |
| | | Item#2 INFO. | RELEVANT AU NUMBER IN AU TABLE IN OBJECT INFO. FILE, etc. |
| | OTHER INFORMATION | | |
| P LIST #2 INFO. TABLE | P LIST #2 COMPREHENSIVE INFO. | | TOTAL NUMBER OF Items CONSTITUTING P LIST #2 = 2, OTHER INFO. |
| | P LIST #2 Item INFO. TABLE | Item#1 INFO. | RELEVANT AU NUMBER IN AU TABLE IN OBJECT INFO. FILE, etc. |
| | OTHER INFORMATION | | |

OBJECT INFORMATION TABLE 131

| FIELD NAME | | | | CONTENTS |
|---|---|---|---|---|
| AU TABLE COMPREHENSIVE INFO. | | | | NUMBER OF AUs, POINTER TO EACH AU, etc. |
| AU Table | AU #1 (132I) | PU #1 | ES_Table Index #1 | INDEX NO. OF ES_map table = 1 |
| | | | ES_Table Index #2 | 3 |
| | | PU #2 | ES_Table Index #1 | 4 |
| | | | ES_Table Index #2 | 5 |
| | AU #2 | PU #1 | ES_Table Index #1 | 9 |
| | | | ES_Table Index #2 | 10 |
| | | PU #2 | ES_Table Index #1 | 12 |
| | | | ES_Table Index #2 | 13 |
| | AU #3 (302I) | PU #1 | ES_Table Index #1 | 14 |
| | | | ES_Table Index #2 | 15 |
| | | | ES_Table Index #3 | 16 |
| | | | ES_Table Index #4 | 17 |
| | | | ES_Table Index #5 | 18 |
| OTHER INFORMATION | | | | |

ES_Map Table 134

| FIELD NAME | | CONTENTS |
|---|---|---|
| ES_Map Table | ES_map table COMPREHENSIVE INFORMATION | INDEX NO., etc. |
| | Index #1 | ES_PID VALUE =101 |
| | | ADDRESS INFORMATION |
| | Index #2 | ES_PID =102 |
| | | ADDRESS INFORMATION |
| | Index #3 | ES_PID =103 |
| | | ADDRESS INFORMATION |
| | Index #4 | ES_PID =201 |
| | | ADDRESS INFORMATION |
| | Index #5 | ES_PID =202 |
| | | ADDRESS INFORMATION |
| | Index #6 | ES_PID =301 |
| | | ADDRESS INFORMATION |
| | Index #7 | ES_PID =302 |
| | | ADDRESS INFORMATION |
| | Index #8 | ES_PID =303 |
| | | ADDRESS INFORMATION |
| | Index #9 | ES_PID =201 |
| | | ADDRESS INFORMATION |
| | Index #10 | ES_PID =202 |
| | | ADDRESS INFORMATION |
| | Index #11 | ES_PID =203 |
| | | ADDRESS INFORMATION |
| | Index #12 | ES_PID =101 |
| | | ADDRESS INFORMATION |
| | Index #13 | ES_PID =102 |
| | | ADDRESS INFORMATION |
| | Index #14 | ES_PID =101 |
| | | ADDRESS INFORMATION |
| | Index #15 | ES_PID =102 |
| | | ADDRESS INFORMATION |
| | Index #16 | ES_PID =103 |
| | | ADDRESS INFORMATION |
| | Index #17 | ES_PID =104 |
| | | ADDRESS INFORMATION |
| | Index #18 | ES_PID =105 |
| | | ADDRESS INFORMATION |
| OTHER INFORMATION | | |

FIG. 25

INFORMATION RECORDING MEDIUM, INFORMATION RECORDING AND/OR REPRODUCING APPARATUS AND METHOD, PROGRAM STORAGE DEVICE AND COMPUTER DATA SIGNAL EMBODIED IN CARRIER WAVE FOR CONTROLLING RECORD OR REPRODUCTION, AND DATA STRUCTURE INCLUDING CONTROL SIGNAL

BACKGROUND OF THE INVENTION

1. Field of the Invention

The present invention relates to an information recording medium, such as a high-density optical disc, on which various information can be recorded at high density, such as main picture information, audio information, sub picture information, reproduction control information, an apparatus for and a method of recording the information onto the information recording medium, an apparatus for and a method of reproducing the information from the information recording medium, an apparatus and a method capable of both recording and reproducing the information, a program storage device and a computer data signal embodiment in a carrier wave for controlling the record and the reproduction, and a data structure including a control signal for controlling the reproduction.

2. Description of the Related Art

A DVD is generalized as an optical disc on which various information is recorded, such as the main picture information, the audio information, the sub picture information, and the reproduction control information. According to the DVD standard, the main picture information (e.g. video data), the audio information (e.g. audio data), and the sub picture information (e.g. sub picture data) are individually packetized with the reproduction control information (e.g. navigation data) and are multiplexed and recorded on a disc in the "program stream" format of the MPEG 2 (Moving Picture Experts Group phase 2) standard, which is a highly efficient encoding technique. Among them, in the main picture information, there is data compressed according to the MPEG video format (ISO 13818-2), only by one stream within one program stream. On the other hand, the audio information is recorded in a plurality of methods (namely, linear PCM, AC-3, MPEG audio, and the like). The audio information can exist up to 8 streams within one program stream. The sub picture information is defined with a bit map and is compressed and recorded in a run-length method. The sub picture information can exist up to 32 streams within one program stream. In the case of the DVD, as described above, a plurality of streams of the chooseable or selectable audio information (e.g. streams of a stereo sound, a surrounding sound, an original English sound, a dubbed Japanese sound, and the like) and a plurality of streams of the chooseable or selectable sub picture information (e.g. streams of Japanese subtitle, English subtitle, and the like) are multiplexed and recorded by using the program stream format, for one stream of the main picture information in one movie (i.e., one film), for example.

On the other hand, the "transport stream" format of the MPEG 2 standard has been recently standardized, and this is appropriate for a higher capacity or higher speed data transmission. According to this transport stream format, a plurality of "elementary streams" are transmitted at the same time at a much higher transmission rate than that of the above described program stream format. For example, a plurality of shows or programs, such as many TV channels of satellite digital broadcasting, are multiplexed in time sharing (i e., time-division-multiplexed) to one satellite wave and are transmitted at the same time. Namely, in the transport stream format, it is possible to multiplex in time sharing the elementary streams of a plurality of main pictures, each of which has a large data amount, and transmit them at the same time. For example, it is possible to transmit at the same time a plurality of movies recorded on a plurality of DVDs.

Moreover, if employing the transport stream format described above, "multiple broadcasting" or "multi-view broadcasting" is also possible, which can perform in real time an angle change similar to the angle reproduction function (i.e. a function of automatically reproducing a picture of an angle by preparing a plurality of camera angles for one story and specifying the angle which a user would like to see), which has been already realized in the DVD standard, for example. More specifically, according to the "multiple broadcasting", transmitting at the same time a plurality of camera angle pictures about one live coverage or one story as a plurality of elementary streams of the main picture information as one show or program enables the user to freely change in real time the pictures of the desired elementary streams one to another and to watch them, while the user is watching this one show or program through a tuner.

In the above described DVD, the main picture of one stream can be multiple-recorded with the audio information, the sub picture information, and the like of a plurality of streams. However, the main pictures of the plurality of streams cannot be multiple-recorded. Namely, the DVD, with respect to which recording is performed on the basis of the program stream format of the MPEG 2, has such a problem that a plurality of shows or programs cannot be essentially recorded thereon, which are transmitted at that same time in the transport stream format of the MPEG 2 as described above.

Moreover, even if there is a disc, which has such a high transmission rate and has such a high recording capacity or such a high recording density as to be capable of recording at the same time the plurality of shows or programs transmitted in the transport stream format, the DVD still has such a technical problem that it is difficult or almost impossible to judge which elementary stream pair or group (e.g. a pair of a video stream and an audio stream, a group obtained adding a sub picture stream to the above pair) corresponds to a desired show or program to reproduce from among a plurality of elementary streams in a bundle, when reproducing the disc.

Furthermore, in the case of the multiple broadcasting described above, an interpretation rule on the tuner side when the elementary streams of a plurality of main picture information corresponding to a plurality of programs for one show are transmitted at the same time and an interpretation rule on the tuner side when the elementary streams of a plurality of main picture information corresponding to one program for one show are transmitted at the same time, can be freely determined as a local rule for each country or each district, according to the transport stream format of the MPEG 2. Therefore, even if there is the disc, which has such a high transmission rate and has such a high recoding capacity or such a high recording density as to be capable of recording at the same time the plurality of shows or programs transmitted in the transport stream format of the MPEG 2, in the case where the plurality of shows, whose interpretation rules differ from each other as the local rule, are recorded on this disc, there is left such a technical problem that it is difficult or almost impossible to judge which elementary streams or which main pictures can be freely switched to each other, when reproducing the disc. Especially, in the case of recording on one disc the multiple-broadcasted show whose interpretation rules differ as described above, it is conceivable that the handling or response by an information reproducing apparatus must be complicate and difficult. Alternatively, in order to enable the multiple broadcasting to be reproduced in the same interpretation rules at a plurality of information reproducing apparatuses whose set interpretation rules differ from each other, there is left such a technical problem that it is necessary to apply a change onto the elementary stream format when recording.

SUMMARY OF THE INVENTION

It is therefore an object of the present invention to provide an information recording medium, an apparatus for and a method of recording information, an apparatus for and a method of reproducing the information, an apparatus for and a method of recording and reproducing the information, a program storage device and a computer data signal embodiment in a carrier wave for controlling the record or the reproduction, and a data structure including a control signal for controlling the reproduction, which make it possible to multiple-record a plurality of shows or programs and relatively simply reproduce a desired one from among them.

The above object of the present invention can be achieved by an information recording medium on which an entire stream including a plurality of portion streams, each of which is provided with picture information or audio information constituting a series of content, is multiplexed-and-recorded by a unit of packet, which is a physically accessible unit, provided with: an object data file for storing object data, which is a logically accessible unit and is constructed by a plurality of packets, each of which stores therein a segment of the picture information or the audio information; a reproduction sequence information file for storing reproduction sequence information which defines a reproduction sequence of the object data stored in the object data file; and an object information file for storing, as reproduction control information for controlling a reproduction of the object data file, (i) correspondence definition information which defines a correspondence relationship between a plurality of packets, which are multiplexed on a time axis, and the plurality of portion streams and (ii) related group definition information which defines as a related group a group having a specific relation from among a plurality of series of contents constituting the plurality of portion streams.

According to the information recording apparatus, the entire stream, such as at least one portion of the transport stream of the MPEG 2, is provided with a plurality of portion streams, such as elementary streams. Each of the portion streams is provided with picture information (e.g. video data and sub picture data) or audio information (e.g. audio data) constituting a series of content, which can be reproduced by the information reproducing apparatus. Namely, one "portion stream" herein indicates one data array or information array, such as the video stream, the audio stream, and the sub picture stream constituting a series of content, which can be, for example, the elementary stream. On the other hand, one "entire stream" herein indicates the data array or information array made by a plurality of portion streams in a bundle. The entire stream may be the transport stream itself made by m elementary streams in a bundle of the MPEG 2 (n: natural number, m≧2). The entire stream may be the data array or information array made by n elementary streams in a bundle (n: natural number, 2≦n<m). The entire stream of this type is multiplexed-and-recorded on the information recording medium by a unit of packet (e.g. TS packet as described later), which is a physically accessible unit, by the information reproducing apparatus. Especially, the object data file is a logically accessible unit by the information reproducing apparatus and stores the object data constructed by a plurality of packets, each of which stores therein a segment of the picture information or the audio information. The reproduction sequence information file stores the reproduction sequence information (e.g. play list information), which defines the reproduction sequence of the object data stored in this object data file. The object information file stores, as the reproduction control information for controlling the reproduction of the object data file by the information reproducing apparatus, (i) the correspondence definition information (e.g. an ES_Map Table indicating an elementary stream packet ID (ES_PID), as described later) and (ii) the related group definition information (e.g. AU information or an AU information table as described later). Various information stored in the object information file and the reproduction sequence information file described above is not multiplexed by a unit of packet on the information recording medium, which is different from the case of the object data file. Therefore, on the basis of the reproduction control information and the reproduction sequence information, it becomes possible to reproduce the object data on the information reproducing apparatus. Especially, in this case, in the information reproducing apparatus, it becomes possible to reproduce a desired show or program constructed by the combination of the picture information and the audio information consisting of one portion of the entire stream which is multiplexed and recorded on the information recording medium, on the basis of the correspondence relationship between a plurality of packets and a plurality of portion streams multiplexed on the time axis (e.g., at a same time point on the time axis of recording or reproducing a plurality of portion streams) and described in the correspondence definition information included in the reproduction control information. Moreover, it is possible to relatively easily reproduce a desired one of a plurality of shows or programs, which are multiplexed and recorded, by specifying a plurality of portion streams corresponding this desired shows or programs (e.g. a pair of the video stream and the audio stream, a group obtained adding the sub picture stream to the above pair) on the basis of the related group (e.g. the AU as described later) which has a specific relation from among a plurality of series of contents constituting the plurality of portion streams and which is described in the related group definition information included in the reproduction control information. In addition, on the basis of this related group, it becomes possible to easily recognize, on the information reproducing apparatus side, the related group having a specific relationship, such as multi-vision broadcasting, multi-view broadcasting, bilingual broadcasting, and bilingual caption broadcasting.

Consequently, even if the content is complicate such that one show or program is constructed from a plurality of portion streams, it becomes possible to reproduce it without any problem according to the related group definition information on the information recording medium, independently of a definition rule or an interpretation rule (e.g. the contents of PAT and PMT as described later) which is packetized in the transport stream at the time of the transmission of these contents. Moreover, this type of record is performed not by applying a change onto the data structure of such a transport stream that a plurality of TV channel shows or programs are digital-broadcasted at the same time, but by recording the object information file, the reproduction sequence information file, and the like, in addition to the data structure, which is extremely useful in practice.

In one aspect of the information recording medium of the present invention, the object information file further stores, as the reproduction control information, sub group definition information which defines as a sub group a group of the plurality of portion streams mutually changeable by an information reproduction apparatus in the related group.

According to this aspect, the object information file stores the sub group definition information (e.g. PU information as described later) as one of the reproduction control information to control the reproduction of the object data file by the information reproducing apparatus. Therefore, on the basis of the sub group (e.g. the PU as described later) of the plurality of portion streams mutually changeable by the information reproduction apparatus within the related group, it is possible to easily recognize the elementary stream, which can be freely switched over, within the related group having a specific relationship, such as multi-vision broadcasting, multi-view broadcasting, bilingual broadcasting, and bilingual caption broadcasting.

In another aspect of the information recording medium of the present invention, the related group definition information defines such that a same content may commonly belong to two or more groups, each of which is defined as the related group.

According to this aspect, the same content can be commonly used between a plurality of related groups when reproducing, which helps to save a recording capacity on the information recording medium.

In another aspect of the information recording medium of the present invention, the sub group definition information defines such that a same portion stream may commonly belong to two or more groups, each of which is defined as the sub group According to this aspect, the same content can be commonly used between a plurality of sub groups when reproducing, which helps to save a recording capacity on the information recording medium.

In another aspect of the information recording medium of the present invention, the entire stream includes two or more portion streams each constructed by main picture information which is the series of content as the picture information.

According to this aspect, it is possible to collectively record, by multiplexing and recording, the entire stream, such as the transport stream of the MPEG 2, which includes two or more portion streams (i.e. the video stream) each constructed by main picture information, which is useful.

In another aspect of the information recording medium of the present invention, the entire stream includes (i) the portion stream constructed by main picture information which is the series of content as the picture information and (ii) the portion stream constructed by sub picture information which is the series of content as the picture information.

According to this aspect, it is also possible to multiplex the portion stream (i.e. the sub picture stream) constructed by the sub picture information for adding subtitles, captions or the like, into the entire stream. In this case, it is also possible to correlate a plurality of portion streams constructed by a plurality of sub picture information, with one portion stream constructed by one main picture information.

In another aspect of the information recording medium of the present invention, the entire stream is provided with at least one portion of a transport stream of MPEG 2 and the related group definition information defines as the related group a group having a multi broadcasting relationship from among the plurality of series of contents.

According to this aspect, since the related group definition information defines the related group having a multi broadcasting relationship by the transport stream, even if the multi broadcasting is collectively recorded onto the information recording medium, it becomes possible to appropriately reproduce the multi broadcasting on the basis of the related group information.

In another aspect of the information recording medium of the present invention, the related group definition information includes what defines as the related group the plurality of series of contents corresponding to one show constructed by a plurality of programs.

According to this aspect, even in the case of defining, by a local rule such as a rule for each country, the plurality of series of contents corresponding to one show constructed by a plurality of programs as a group constituting the multi broadcasting or the like, the reproduction corresponding to the multi broadcasting or the like can be performed from the information multiplexed and recorded on the information recording medium, on the basis of the related group information.

Alternatively, in another aspect of the information recording medium of the present invention, the related group definition information includes what defines as the related group the plurality of series of contents corresponding to one show constructed by one program.

According to this aspect, even in the case of defining, by a local rule such as a rule for each country, the plurality of series of contents corresponding to one show constructed by one program as a group constituting the multi broadcasting or the like, the reproduction corresponding to the multi broadcasting or the like can be performed from the information multiplexed and recorded on the information recording medium, on the basis of the related group information.

The above object of the present invention can be achieved by an information recording apparatus for multiplexing and recording an entire stream by a unit of packet which is a physically accessible unit onto an information recording medium, the entire stream, including a plurality of portion streams each of which is provided with picture information or audio information constituting a series of content, the apparatus provided with: a first recording device for recording an object data file, the object data file storing object data, which is a logically accessible unit and is constructed by a plurality of packets, each of which stores therein a segment of the picture information or the audio information; a second recording device for recording a reproduction sequence information file, the reproduction sequence information file storing reproduction sequence information which defines a reproduction sequence of the object data stored in the object data file; and a third recording device for recording an object information file, the object information file storing, as reproduction control information for controlling a reproduction of the object data file, (i) correspondence definition information which defines a correspondence relationship between a plurality of packets, which are multiplexed on a time axis, and the plurality of portion streams and (ii) related group definition information which defines as a related group a group having a specific relation from among a plurality of series of contents constituting the plurality of portion streams.

According to the information recording apparatus of the present invention, the object data file storing the object data is recorded by the first recording device, such as a system controller, an encoder, a TS object generator as described later, and an optical pickup. The reproduction sequence information file storing the reproduction sequence information is recorded by the second recording device, such as a system controller and an optical pickup. The object information file storing the correspondence definition information and the related group definition information is recorded by the third recording device, such as a system controller and an optical pickup, as the reproduction control information. Therefore, it is possible to collectively multiplex and record the entire stream, such as at least one portion of the transport stream of the MPEG 2, onto the above-described information recording medium of the present invention. In this case, although the first recording device multiplexes and records the object data by a unit of packet, the second and third recording devices do not multiplex and record the reproduction sequence information and the reproduction control information by a unit of packet, respectively.

Incidentally, the information recording apparatus of the present invention can also employ various aspects in response to various aspects of the above-described information recording medium of the present invention.

In one aspect of the information recording apparatus of the present invention, the entire stream is provided with at least one portion of a transport stream of MPEG 2, which is digitally-transmitted and is received at a set box.

According to this aspect, the entire streams, such as at least one portion of the transport stream of the MPEG 2 (i.e. a portion corresponding to TV shows or TV programs of all channels or a plurality of channels), which is digitally-transmitted and broadcasted, can be multiplexed and recorded onto the information recording medium in real time, which is extremely useful.

The above object of the present invention can be achieved by an information recording method of multiplexing and recording an entire stream by a unit of packet which is a physically accessible unit onto an information recording medium, the entire stream including a plurality of portion streams each of which is provided with picture information or audio information constituting a series of content, the method provided with: a first recording process of recording an object data file, the object data file storing object data, which is a logically accessible unit and is constructed by a plurality of packets, each of which stores therein a segment of the picture information or the audio information; a second recording process of recording a reproduction sequence information file, the reproduction sequence information file storing reproduction sequence information which defines a reproduction sequence of the object data stored in the object data file; and a third recording process of recording an object information file, the object information file storing, as reproduction control information for controlling a reproduction of the object data file, (i) correspondence definition information which defines a correspondence relationship between a plurality of packets, which are multiplexed on a time axis, and the plurality of portion streams and (ii) related group definition information which defines as a related group a group having a specific relation from among a plurality of series of contents constituting the plurality of portion streams.

According to the information recording method of the present invention, the object data file storing the object data is recorded by the first recording process. The reproduction sequence information file storing the reproduction sequence information is recorded by the second recording process. The object information file storing the correspondence definition information and the related group definition information is recorded by the third recording process. Therefore, it is possible to collectively multiplex and record the entire stream, such as at least one portion of the transport stream of the MPEG 2, onto the above-described information recording medium of the present invention. In this case, although the first recording process multiplexes and records the object data by a unit of packet, the second and third recording processes do not multiplex and record the reproduction sequence information and the reproduction control information by a unit of packet, respectively.

Incidentally, the information recording method of the present invention can also employ various aspects in response to various aspects of the above-described information recording medium of the present invention.

In one aspect of the information recording method of the present invention, the entire stream is provided with at least one portion of a transport stream of MPEG 2, which is digitally-transmitted and is received at a set box.

According to this aspect, the entire stream, such as at least one portion of the transport stream of the MPEG 2, which is digitally-transmitted and broadcasted, can be multiplexed and recorded onto the information recording medium in real time, which is extremely useful.

The above object of the present invention can be achieved by an information reproducing apparatus for reproducing one portion of the entire stream from the above-described information recording medium of the present invention (including its various aspects), provided with: a reading device for physically reading the information from the information recording medium; and a reproducing device for reproducing the object data included in the information read by the reading device, on the basis of the reproduction control information and the reproduction sequence information included in the information read by the reading device.

According to the information reproducing apparatus, information is physically read by the reading device, such as an optical pickup and a demodulator, from the information recording medium by a unit of packet or the like. Then, the object data especially read by a unit of packet is reproduced by the reproducing device, such as a system controller, a demultiplexer, and a decoder, on the basis of the reproduction control information and the reproduction sequence information included in this read information. Therefore, it is possible to appropriately reproduce, as a series of content information, the information multiplexed and recorded on the above-described information recording medium of the present invention.

Incidentally, the information reproducing apparatus of the present invention can also employ various aspects in response to various aspects of the above-described information recording medium of the present invention.

The above object of the present invention can be achieved by an information reproducing method of reproducing one portion of the entire stream recorded on the above-described information recording medium of the present invention (including its various aspects), provided with: a reading process of physically reading the information from the information recording medium; and a reproducing process of reproducing the object data included in the information read by the reading process, on the basis of the reproduction control information and the reproduction sequence information included in the information read by the reading process.

According to the information reproducing method, information is physically read by the reading process from the information recording medium by a unit of packet or the like. Then, the object data especially read by a unit of packet is reproduced by the reproducing process on the basis of the reproduction control information and the reproduction sequence information included in this read information Therefore, it is possible to appropriately reproduce, as a series of content information, the information multiplexed and recorded on the above-described information recording medium of the present invention.

Incidentally, the information reproducing method of the present invention can also employ various aspects in response to various aspects of the above-described information recording medium of the present invention.

The above object of the present invention can be achieved by an information recording and reproducing apparatus for multiplexing and recording the entire stream onto the information recording medium of the present invention (including its various aspects), and reproducing one portion of the recorded entire stream, provided with: a first recording device for recording the object data file onto the information recording medium; a second recording device for recording the reproduction sequence information file onto the information recording medium; a third recording device for recording the object information file onto the information recording medium; a reading device for physically reading the information from the information recording medium; and a reproducing device for reproducing the object data included in the information read by the reading device, on the basis of the reproduction control information and the reproduction sequence information included in the information read by the reading device.

According to the information recording and reproducing apparatus of the present invention, as is the case of the above-described information recording apparatus of the present invention, the object data file is multiplexed and recorded by the first recording device by a unit of packet, the reproduction sequence information file is recorded by the second recording device, and the object information file is recorded by the third recording device. Then, as is the case of the above-described information reproducing apparatus of the present invention, the information is physically read by the reading device from the information recording medium, and the object data especially read by a unit of packet is reproduced by the reproducing device on the basis of the reproduction control information and the reproduction sequence information included in this read information. Therefore, it is possible to collectively multiplex and record the entire stream, such as at least one portion of the transport stream of the MPEG 2, onto the above-described information recording medium of the present invention, and further it is possible to appropriately reproduce, as a series of content information, this multiplexed-and-recorded information.

Incidentally, the information recording and reproducing apparatus of the present invention can also employ various aspects in response to various aspects of the above-described information recording medium of the present invention.

The above object of the present invention can be achieved by an information recording and reproducing method of multiplexing and recording an entire stream onto the above-described information recording medium of the present invention (including its various aspects), and of reproducing one portion of the recorded entire stream, provided with: a first recording process of recording the object data file onto the information recording medium; a second recording process of recording the reproduction sequence information file onto the information recording medium; a third recording process of recording the object information file onto the information recording medium; a reading process of physically reading the information from the information recording medium; and a reproducing process of reproducing the object data included in the information read by the reading process, on the basis of the reproduction control information and the reproduction sequence information included in the information read by the reading process.

According to the information recording and reproducing method of the present invention, as is the case of the above-described information recording method of the present invention, the object data file is multiplexed and recorded by the first recording process by a unit of packet, the reproduction sequence information file is recorded by the second recording process, and the object information file is recorded by the third recording process. Then, as is the case of the above-described information reproducing method of the present invention, information is physically read by the reading process from the information recording medium, and the object data especially read by a unit of packet is reproduced by the reproducing process on the basis of the reproduction control information and the reproduction sequence information included in this read information. Therefore, it is possible to collectively multiplex and record the entire stream, such as at least one portion of the transport stream of the MPEG 2, onto the above-described information recording medium of the present invention, and further it is possible to appropriately reproduce, as a series of content information, this multiplexed-and-recorded information.

Incidentally, the information recording and reproducing method of the present invention can also employ various aspects in response to various aspects of the above-described information recording medium of the present invention.

The above object of the present invention can be also achieved by a program storage device readable by a computer in the information recording apparatus of the present invention (including its various aspects) for tangibly embodying a program of instructions executable by the computer to perform method processes provided with the above-described first to third recording processes of the recording method of the present invention.

According to the program storage device, such as a CD-ROM (Compact Disc—Read Only Memory), a ROM, a DVD-ROM (DVD Read Only Memory), a hard disk or the like, of the present invention, the above described information recording apparatus and method of the present invention can be relatively easily realized as a computer reads and executes the program of instructions or as it executes the program after downloading the program through communication device.

The above object of the present invention can be also achieved by a computer data signal embodied in a carrier wave and representing a series of instructions which cause a computer in the above mentioned information recording apparatus of the present invention (including its various aspects) to perform method processes provided with the above-described first to third recording processes of the recording method of the present invention.

According to the computer data signal embodied in the carrier wave of the present invention, as the computer downloads the program in the computer data signal through a computer network or the like, and executes this program, it is possible to realize the above described information recording apparatus and method of the present invention.

The above object of the present invention can be also achieved by a program storage device readable by a computer in the above described information reproducing apparatus of the present invention (including its various aspects) to perform method processes provided with the above-described reproducing process of the reproducing method of the present invention.

According to the program storage device, such as a CD-ROM, a ROM, a DVD-ROM, a hard disk or the like, of the present invention, the above described information reproducing apparatus and method of the present invention can be relatively easily realized as a computer reads and executes the program of instructions or as it executes the program after downloading the program through communication device.

The above object of the present invention can be also achieved by a computer data signal embodied in a carrier wave and representing a series of instructions which cause a computer in the above described information reproducing apparatus of the present invention (including its various aspects) to perform method processes provided with the above-described reproducing process of the reproducing method of the present invention.

According to the computer data signal embodied in the carrier wave of the present invention, as the computer downloads the program in the computer data signal through a computer network or the like, and executes this program, it is possible to realize the above described information reproducing apparatus and method of the present invention.

The above object of the present invention can be also achieved by a program storage device readable by a computer in the above described information recording and reproducing apparatus of the present invention (including its various aspects) to perform method processes provided with the above-described first to third recording processes of the above mentioned recording method of the present invention and the reproducing process of the above described reproducing method of the present invention.

According to the program storage device, such as a CD-ROM, a ROM, a DVD-ROM, a floppy disk or the like, of the present invention, the above described information recording and reproducing method of the present invention can be relatively easily realized as a computer reads and executes the program of instructions or as it executes the program after downloading the program through communication device.

The above object of the present invention can be also achieved by a computer data signal embodied in a carrier wave and representing a series of instructions which cause a computer in the above described information recording and reproducing apparatus of the present invention (including its various aspects) to perform method processes provided with the above-described first to third recording processes of the above mentioned recording method of the present invention and the reproducing process of the above described reproducing method of the present invention.

According to the computer data signal embodied in the carrier wave of the present invention, as the computer downloads the program in the computer data signal through a computer network or the like, and executes this program, it is possible to realize the above described information recording and reproducing apparatus and method of the present invention.

The above object of the present invention can be also achieved by a data structure in which an entire stream including a plurality of portion streams, each of which is provided with picture information or audio information constituting a series of content, is multiplexed by a unit of packet, which is a physically accessible unit, provided with: an object data file for storing object data, which is a logically accessible unit and is constructed by a plurality of packets, each of which stores therein a segment of the picture information or the audio information; a reproduction sequence information file for storing reproduction sequence information which defines a reproduction sequence of the object data stored in the object data file; and an object information file for storing, as reproduction control information for controlling a reproduction of the object data file, (i) correspondence definition information which defines a correspondence relationship between a plurality of packets, which are multiplexed on a time axis, and the plurality of portion streams and (ii) related group definition information which defines as a related group a group having a specific relation from among a plurality of series of contents constituting the plurality of portion streams.

According to the data structure of the present invention, as is the case of the information recording medium of the present invention, even if the content is complicate such that one show or program is constructed from a plurality of portion streams, it becomes possible to reproduce it without any problem according to the related group definition information on the information recording medium, independently of a definition rule or an interpretation rule (e.g. the contents of PAT and PMT as described later) which is packetized in the transport stream at the time of the transmission of these contents.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 18 is a schematic diagram showing the data structures of PAT and PMT of the TS object #2 in one specific example of the embodiment;

FIG. 19 is a schematic diagram showing the data structure of the TS object #3 in one specific example of the embodiment;

FIG. 20 is a schematic diagram showing the data structures of PAT and PMT of the TS object #3 in one specific example of the embodiment;

FIG. 21 is a schematic diagram showing the data structure finally constructed on the optical disc in one specific example of the embodiment;

FIG. 22 is a schematic diagram showing one specific example of the data structure of a disc information file in one specific example of the embodiment;

FIG. 23 is a schematic diagram showing one specific example of the data structure of a title information table included in the disc information file in one specific example of the embodiment;

FIG. 24 is a schematic diagram showing one specific example of the data structure of a play list information table constructed in a play list information file in one specific example of the embodiment; and FIG. 25 is a schematic diagram showing one specific example of the data structures of an AU table constructed in an object information file and an ES map table related to the AU table in one specific example of the embodiment.

DETAILED DESCRIPTION OF THE PREFERRED EMBODIMENT

Information Recording Medium

The embodiment of an information recording medium of the present invention will be explained with reference to FIG. 1 to FIG. 8. In this embodiment, the information recording medium of the present invention is applied for an optical disc capable of recording (writing) and reproducing (reading).

Figure 1:
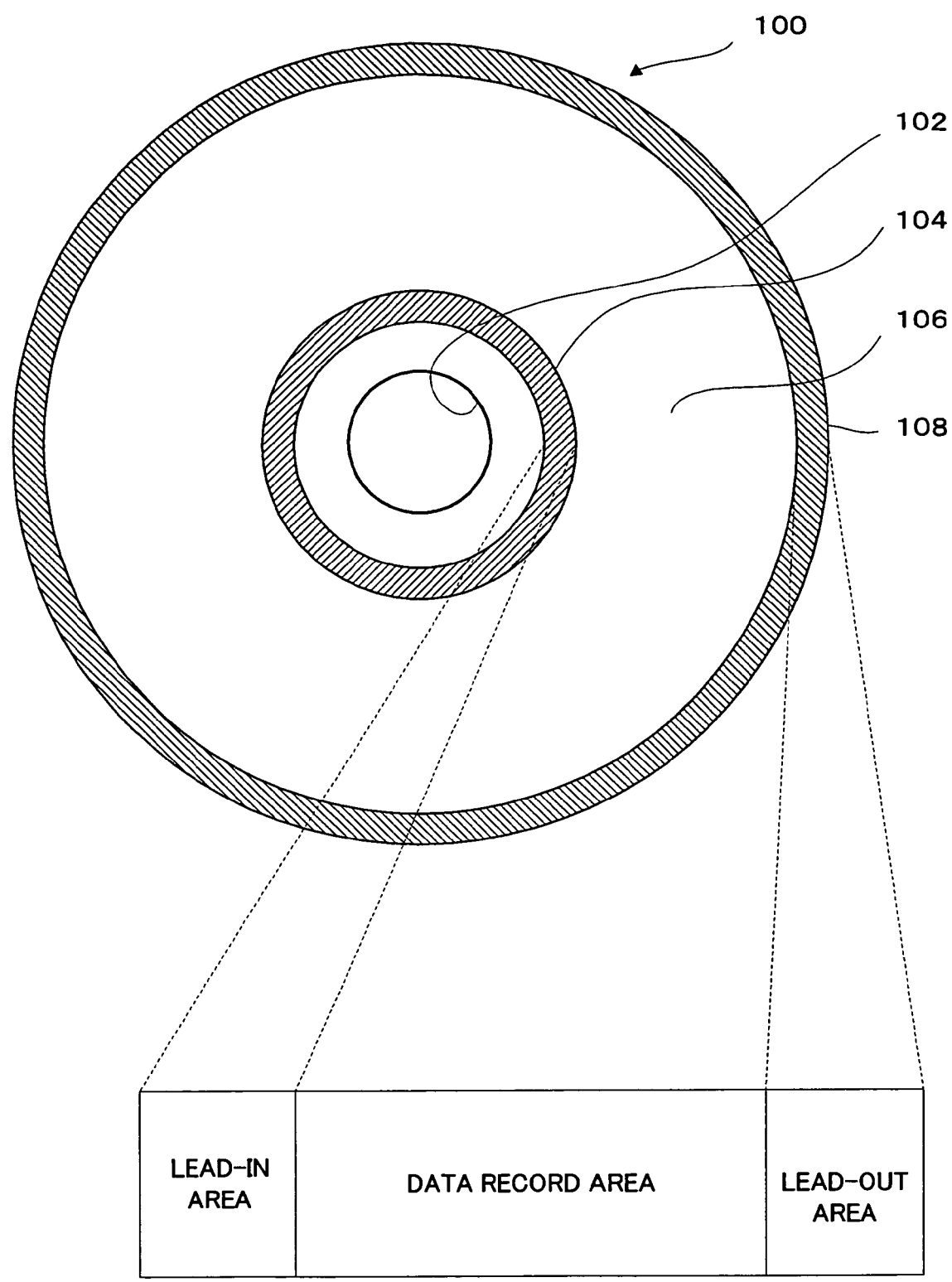
FIG. 1 is a diagram showing a basic structure of an optical disc as being one embodiment of an information recording medium of the present invention, the upper part being a schematic plan view of the optical disc having a plurality of areas, the corresponding bottom part being an schematic diagram of the area structure in the diameter direction.

Firstly, the basic structure of the optical disc in the embodiment will be explained with reference to FIG. 1. The upper part of FIG. 1 is a schematic plan view of the optical disc structure having a plurality of areas, and the bottom part is a schematic diagram of the area structure in its diameter direction As shown in FIG. 1, an optical disc 100 is recordable in various recoding methods, such as a magnet-optical method and a phase transition method, onto which it is possible to record (write) information a plurality of times or only once. It is provided with a lead-in area 104, a data record area 106, and a lead-out area 108 on a recording surface on the disc main body, which is about 12 cm in diameter, as is the DVD, with a center hole 102 as the center, in the direction from the inner circumference to the outer circumference. In each area, a groove track and a land track are alternately placed spirally or coaxially with the center hole 102 as the center, for example. This groove track may be wobbled, and a pre-pit may be formed on either or both of the tracks. Incidentally, the present invention is not specially limited to an optical disc having these three areas.

Figure 2A:
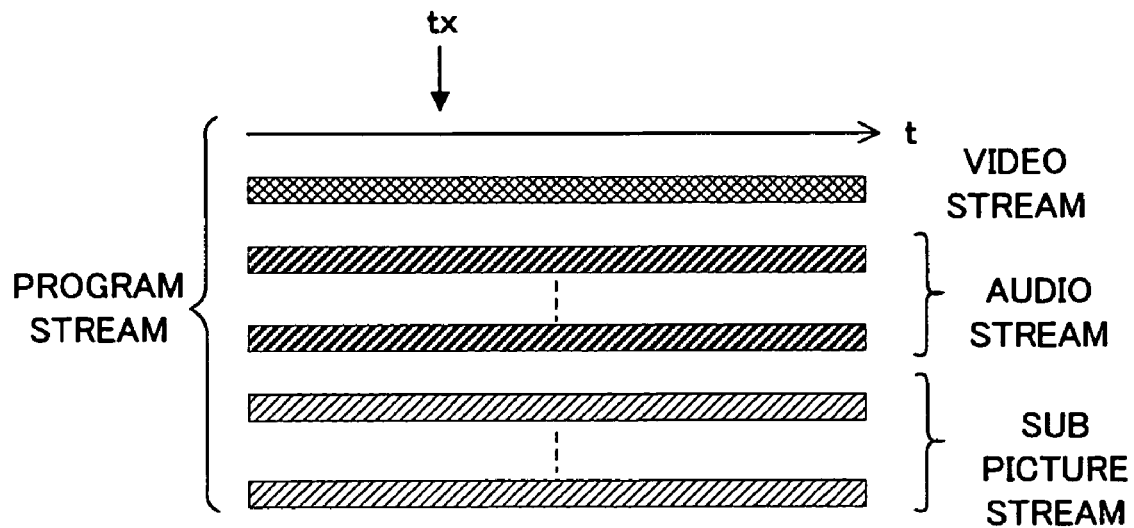
FIG. 2A is a schematic diagram of the conventional program stream of the MPEG 2.
Figure 2B:
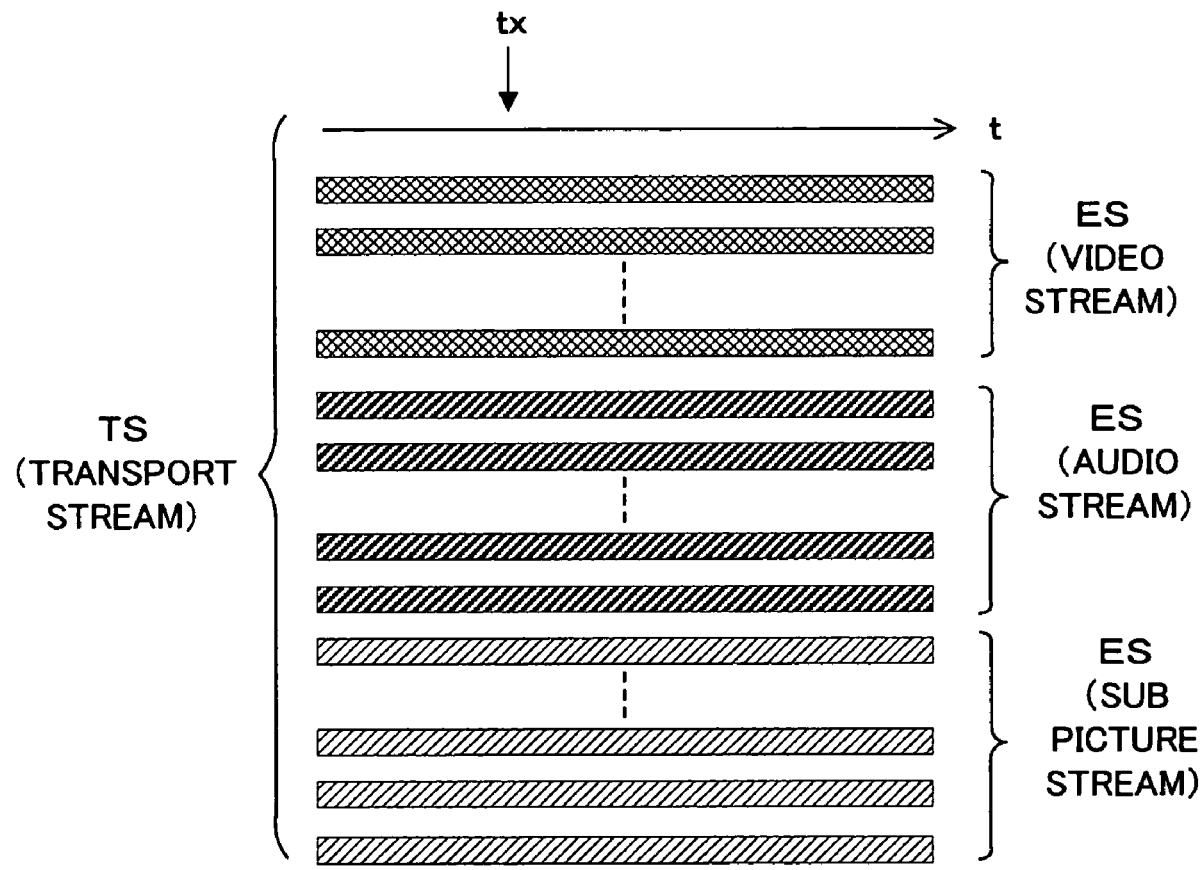
FIG. 2B is a schematic diagram of the transport stream of the MPEG 2 used in the embodiment.

Secondly, the configuration of a transport stream (TS) recorded on the optical disc of the present invention will be explained with reference to FIG. 2A and FIG. 2B. FIG. 2A is a schematic diagram showing the configuration of a conventional program stream of the MPEG 2, as a comparison. FIG. 2B is a schematic diagram showing the configuration of the transport stream (TS) of the MPEG 2.

In FIG. 2A, one program stream includes (i) only one video stream for video data as being the main picture information, and further (ii) at most 8 audio streams for audio data as being the audio information, and also (iii) at most 32 sub picture streams for sub picture data as being the sub picture information, along a time axis t. Namely, the video data multiplexed at an arbitrary time tx is related to only the one video stream. For example, a plurality of video streams corresponding to a plurality of TV shows or movies cannot be included in the program stream at the same time. In order to multiplex the TV show and the like accompanying pictures and transmit or record them, at least one video stream is required for each TV show and the like, so that the program stream format in which only one video stream exists cannot allow the plurality of TV shows and the like to be transmitted or recorded after multiplexing them.

In FIG. 2B, one transport stream (TS) includes (i) a plurality of video streams as an elementary stream (ES) for the video data as being the main picture information, and further (ii) a plurality of audio streams as an elementary stream (ES) for the audio data as being the audio information, and also (iii) a plurality of sub picture streams as an elementary stream (ES) for the sub picture data as being the sub picture information. Namely, the video data multiplexed at an arbitrary time tx is related to the plurality of video streams. For example, the plurality of video streams corresponding to a plurality of TV shows or movies can be included in the transport stream at the same time. As described above, the transport stream format whose transmission rate is high and in which there are the plurality of video streams can allow the plurality of TV shows and the like to be transmitted or recorded after multiplexing them. However, digital broadcasting that employs an existing transport stream does not transmit the sub picture stream.

Incidentally, in FIG. 2A and FIG. 2B, the video stream, the audio stream, and the sub picture stream are arranged in this order from up to down for explanatory convenience; however, this order is not intended to correspond to an order of multiplexing them in units of a packet, as described later, or the like. In the transport stream, one combination, which is one video stream, two audio streams, and two sub picture streams, conceptually corresponds to one show, for example.

The optical disc 100 in the embodiment described above is constructed to multiplex-and-record onto it the transport stream (TS) including a plurality of elementary streams (ES) in the above manner, to simultaneously record onto it the plurality of shows or programs.

Figure 3:
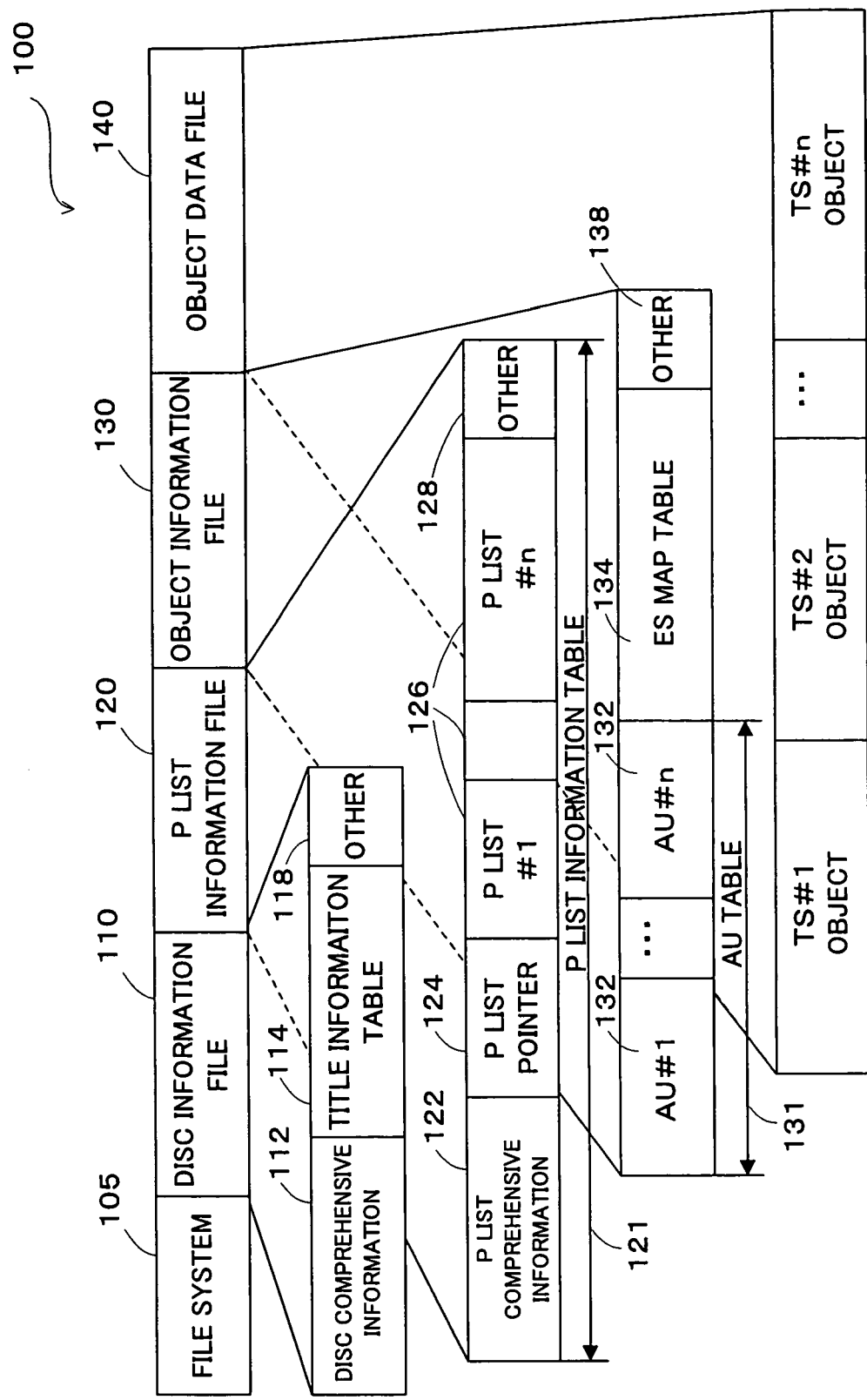
FIG. 3 is a schematic diagram showing a data structure recorded on the optical disc in the embodiment.
Figure 4:
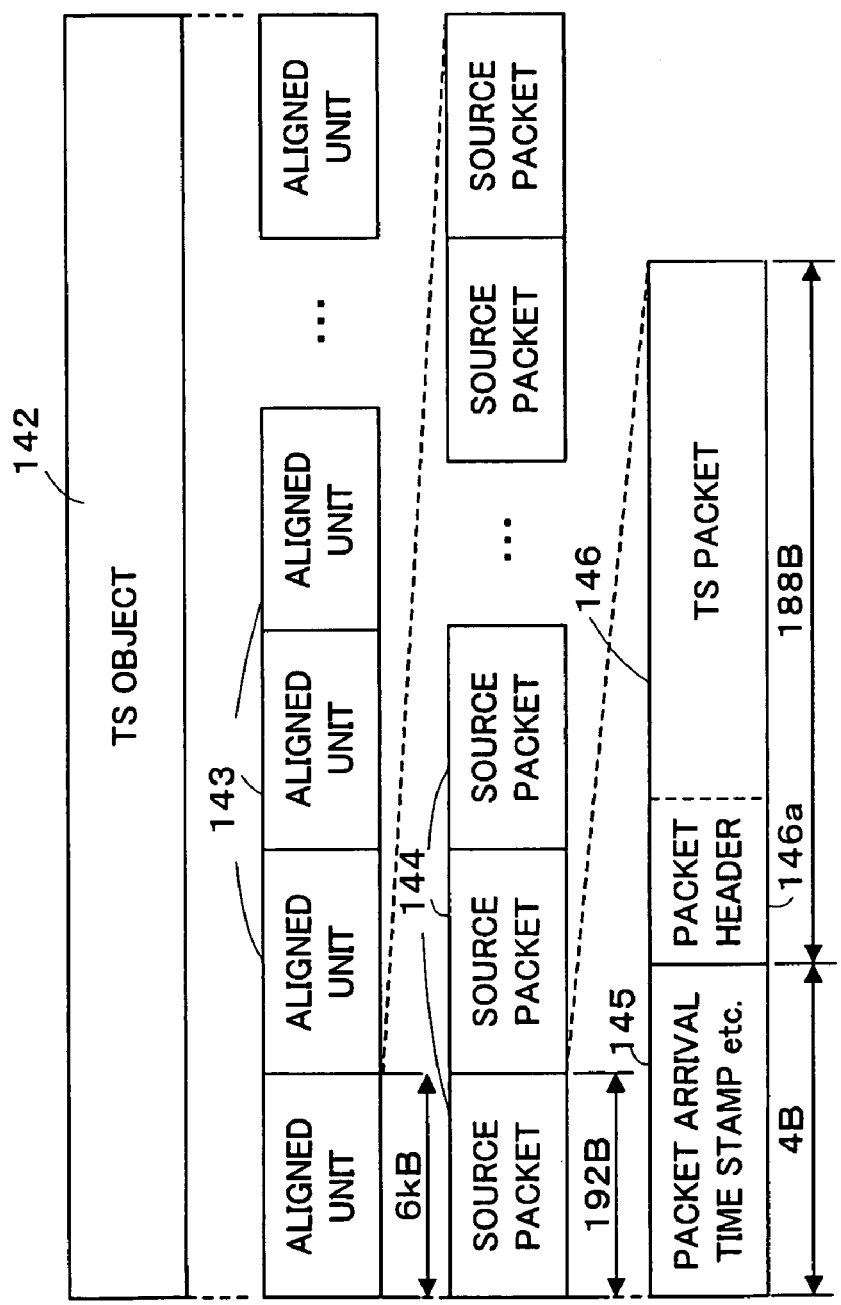
FIG. 4 is a schematic diagram showing details of the data structure in each object shown in FIG. 3.

Next, a data structure recorded on the optical disc 100 will be explained with reference to FIG. 3 and FIG. 4. FIG. 3 is a schematic diagram showing the data structure recorded on the optical disc 100. FIG. 4 is a schematic diagram showing details of the data structure in each object shown in FIG. 3.

In the explanation below, a "title" is a reproduction unit sequentially executing a plurality of "play lists", and is a logically large unit, such as one movie and one TV show. The "play list" is a file storing information necessary for the reproduction of an "object", and is provided with a plurality of "Items", each of which stores information about the reproduction range of the object to access the object. More specifically, "IN point information" indicating a start address of the object and "OUT point information" indicating an end address of the object are written in each Item. Incidentally, these "IN point information" and "OUT point information" may respectively show the addresses directly, or show the addresses indirectly by showing a time length or a time point on a reproduction time axis. The "object" is the entity information of a content constituting the transport stream of the MPEG 2 described above.

In FIG. 3, the optical disc 100 is provided with the following four files as a logical structure: a disc information file 110, a play (P) list information file 120, an object information file 130, and an object data file 140. It is further provided with a file system 105 to manage those files as for their physical allocations. Incidentally, FIG. 3 does not directly show the physical data alignment on the optical disc 100, but it is possible to record with the arrangement order shown in FIG. 3 corresponding to the arrangement order shown in FIG. 1. Namely, it is possible to record the file system 105 or the like in the lead-in area 104d, and then in the data record area 106, and further it is also possible to record the object data file 140 or the like in the data record area 106. Even if the lead-in area 104 and/or the lead-out area 108 shown in FIG. 1 do no exist, the file structure shown in FIG. 3 can be constructed.

The disc information file 110 is a file for storing comprehensive information about the whole optical disc 100, and it stores disc comprehensive information 112, a title information table 114, and other information 118. The disc comprehensive information 112 stores the total number of titles and the like in the optical disc 100, for example. The title information table 114 stores, for each title, each title type (e.g. a sequential reproduction type, a branch type, and the like, as described later with reference to FIG. 8) and a play (P) list number, which constitutes each title, as logical information.

The play list information file 120 is a reproduction sequence information file. The play list information file 120 stores a play (P) list information table 121, which indicates the logical construction of each play list and which is separated into play (P) list comprehensive information, a play (P) list pointer 124, a plurality of play (P) lists 126 (P lists #1 to #n), and other information 128. This play list information table 121 stores the logical information of each play list 126 in the order of the play list number. In other words, the storing order of each play list 126 is the play list number. Moreover, it is also possible to refer to the same play list 126 from a plurality of titles at the above described title information table 114. Namely, even in the case where a title #n and a title #m use the same play list #p, it is possible to construct such that the play list #p in the play list information table 121 is pointed at the title information table 114.

The object information file 130 stores various attribute information about the storing positions in the object data file 140 for each Item constituted in each play list 126 (i.e. a logical address for a reproduction object) and about the reproduction of the Item. Especially, in this embodiment, the object information file 130 stores an AU (Associate Unit) table 131 including a plurality of AU information 132I (AU #1 to AU #n), as described later in detail, an ES (Elementary Stream) map table 134, and other information 138.

The object data file 140 stores a plurality of TS objects 142 (TS #1 object to TS #n object) for each transport streams (TS). Namely, it stores a plurality of entity data of the contents to be actually reproduced.

Incidentally, the four files explained with reference to FIG. 3 may be stored with each of them being separated into a plurality of files, and all of them may be managed or administered by the file system 105. For example, the object data file 140 can be separated into a plurality of data files, such as an object data file #1, an object data file #2, . . . and the like.

As shown in FIG. 4, the TS object 142 shown in FIG. 3, which is a logically reproducible unit, is divided into a plurality of aligned units 143, each of which has 6 kB (kiloBytes) data amount, for example. The head of the aligned units 143 corresponds to (or is "aligned" with) the head of the TS object 142. Each aligned unit 143 is further segmentized into a plurality of source packets 144, each of which has 192 B (Bytes) data mount. The source packet 144 is a physically reproducible unit, and by using this unit, i.e. the unit of the packet, at least the video data, the audio data, and the sub picture data are multiplexed among the data on the optical disc 100. The other information may be also multiplexed in this manner. Each source packet 144 includes: control information 145, which has 4 B data amount, for controlling the reproduction, such as a packet arrival time stamp indicating a reproduction start time point (i.e. a time point of starting demultiplexing) of the TS (transport stream) packet on a reproduction time axis etc.; and a TS packet 146, which has 188 B data amount. The TS packet 146 has a packet header 146a at the head portion thereof. The video data is packetized to be a "video packet", the audio data is packetized to be an "audio packet", the sub picture data is packetized to be a "sub picture packet", or the other data is packetized.

Figure 5:
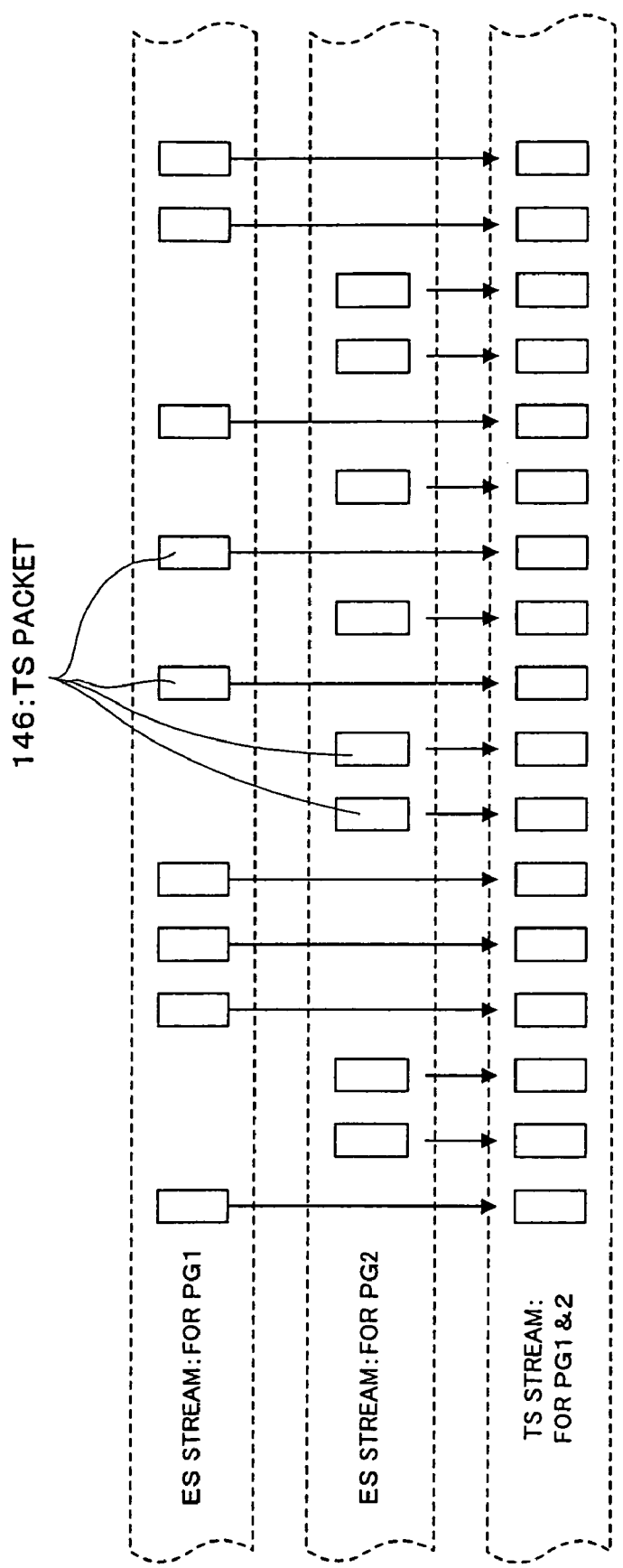
FIG. 5 is a schematic diagram showing that an elementary stream for a program #1 at an upper level and an elementary stream for a program #2 at a middle level are multiplexed, constituting a transport stream for these two programs at a low level, with the horizontal axis as a time axis.
Figure 6:
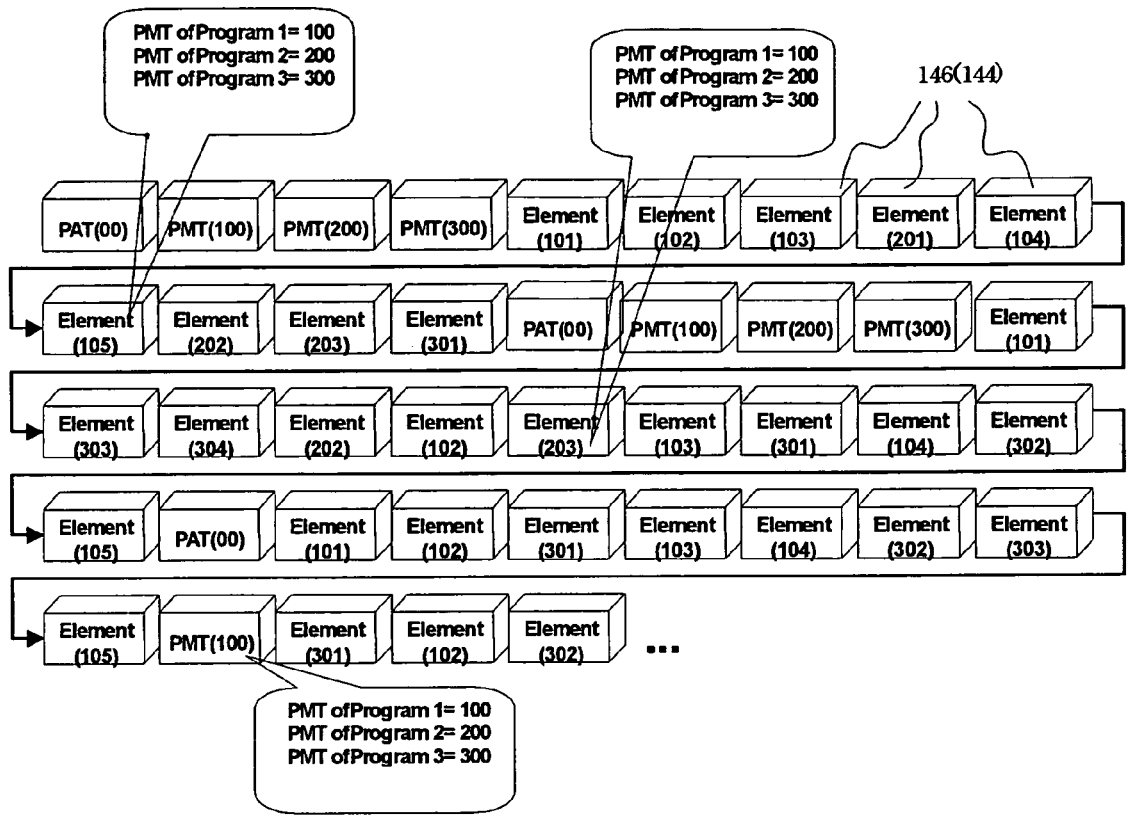
FIG. 6 is a schematic diagram showing the image of TS packets multiplexed in one transport stream as a packet arrangement along time.

Next, with reference to FIG. 5 and FIG. 6, it will be explained the multiple record of the video data, the audio data, the sub picture data, and the like, which are in the transport stream format as shown in FIG. 2B, on the optical disc 100 by the TS packet 146 shown in FIG. 4. FIG. 5 is a schematic diagram showing that an elementary stream (ES) for a program #1 (PG 1) at the upper level in the figure and an elementary stream (ES) for a program #2 (PG 2) at the middle level in the figure are multiplexed, constituting a transport stream (TS) for there two programs (PG 1 & PG 2) at the lower level in the figure, with the horizontal axis as a time axis. FIG. 6 is a schematic diagram showing the image of TS packets multiplexed in one transport stream (TS) as a packet arrangement along time.

As shown in FIG. 5, the TS packets 146 with the video data for the program #1 packetized are discretely arranged with respect to the time axis in the elementary stream for the program #1 (the upper one), for example. The TS packets 146 with the video data for the program #2 packetized are discretely arranged with respect to the time axis in the elementary stream for the program #2 (the middle one), for example. Then, these TS packets 146 are multiplexed, constructing the transport stream (the lower one) for those two programs. Incidentally, this is omitted in FIG. 5 for explanatory convenience, but in fact, the elementary stream provided with the TS packets in which the audio data is packetized and the sub picture stream provided with the TS packets in which the sub picture data is packetized may be multiplexed as the elementary stream for the program #1 in the same manner as shown in FIG. 2B. Moreover, in addition to these, the elementary stream provided with the TS packets in which the audio data is packetized and the sub picture stream provided with the TS packets in which the sub picture data is packetized may be multiplexed as the elementary stream for the program #2 in the same manner.

As shown in FIG. 6, in this embodiment, one TS stream is constructed from many TS packets 146 multiplexed as described above. Then, to each of the many TS packets 146 in this multiplexed form, the control information 145 such as the packet arrival time stamp etc., is added, and the many TS packets 146 are multiplexed-and-recorded on the optical disc 100. Incidentally, "Element (i0j)" is used in FIG. 6 for the TS packet 146 comprising data which constitutes the program #1 (i=1, 2, 3), with j (j=1, 2, . . . ) as a number indicating the order for each stream which constitutes the program. This (i0j) is a packet ID, which is the identification number of the TS packet 146 for each elementary stream. A specific value is given to this packet ID between the plurality of TS packets 146 multiplexed on the time axis (e.g., on the time axis of recording or reproducing a plurality of elementary streams) so that the plurality of TS packets 146 can be mutually distinguished even if they are multiplexed on the time axis.

In FIG. 6, a PAT (Program Associate Table) and a PMT (Program Map Table) are also packetized in the unit of the TS packet 146 and are multiplexed. Among them, the PAT stores a table indicating a plurality of PMT packet IDs. Especially, with regard to the PAT, the MPEG 2 standard defines the addition of (000), as shown in FIG. 6, as a predetermined packet ID. Namely, it is constructed such that the TS packet 146 in which the PAT is packetized is detected as the TS packet 146 with its packet ID (000) from among many packets multiplexed on the time axis. The PMT stores a table indicating the packet ID for each elementary stream constituting each program with respect to one or a plurality of programs. To the PMT, an arbitrary packet ID may be added, but the packet ID of the PMT is indicated by the PAT detectable having the packet ID as (000), as described above. Therefore, the TS packets 146 in each of which the PMT is packetized (i.e. the TS packets 146 with the packet IDs (100), (200), and (300) added in FIG. 6) are detected by virtue of the PAT from among many packets multiplexed on the time axis.

In the case where the transport stream is digital-transmitted as shown in FIG. 6, the tuner can pick up the packets corresponding to the desired elementary stream from among the multiplexed packets by referring to the PAT and the PMT as constructed above, and demodulate it.

In this embodiment, the TS packet 146 stored in the TS object 142 shown in FIG. 4 includes these PAT and PMT packets. Namely, when the transport stream shown in FIG. 6 is transmitted, it can be recorded onto the optical disc 100 as it is, which is a great advantage.

Moreover, in this embodiment, the PAT and PMT as recorded above are not referred to when reproducing the optical disc 100. Instead, referring to the AU table 131 and the ES map table 134, as shown in FIG. 3 and as described later in detail, allows more effective reproduction, and also enables a complicate multi-vision reproduction and the like to be treated with. On that account, in this embodiment, the corresponding relationship between the elementary stream and the packet, which are obtained by referring to the PAT and the PMT when demodulating and recording, is stored in the object information file 130 in the form of the AU table 131 and the ES map table 134 without packetizing nor multiplexing.

Figure 7:
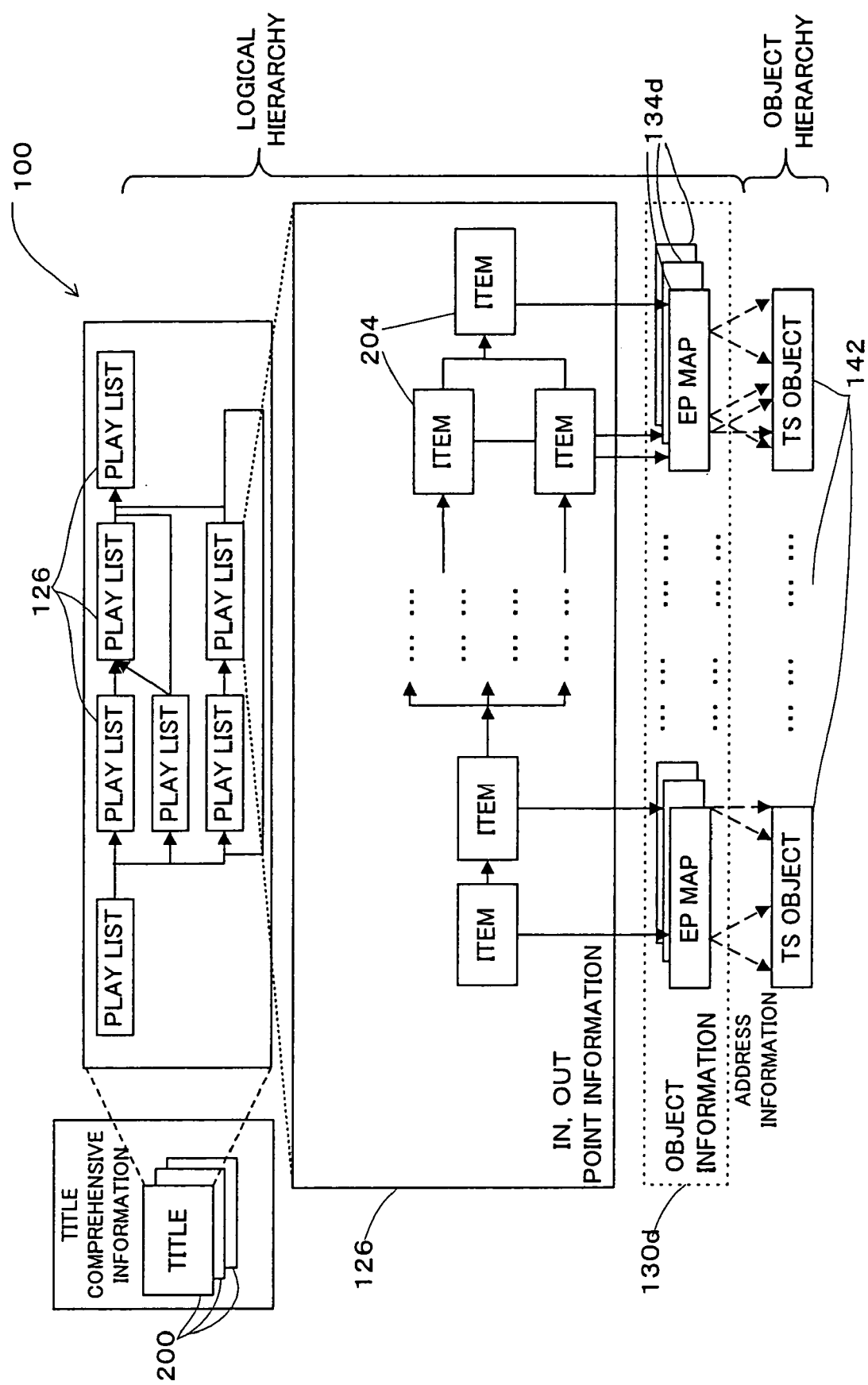
FIG. 7 is a schematic diagram showing the logical construction of data on the optical disc in the embodiment, focusing on the development of a logical hierarchy to an object hierarchy or an entity hierarchy.
Figure 8:
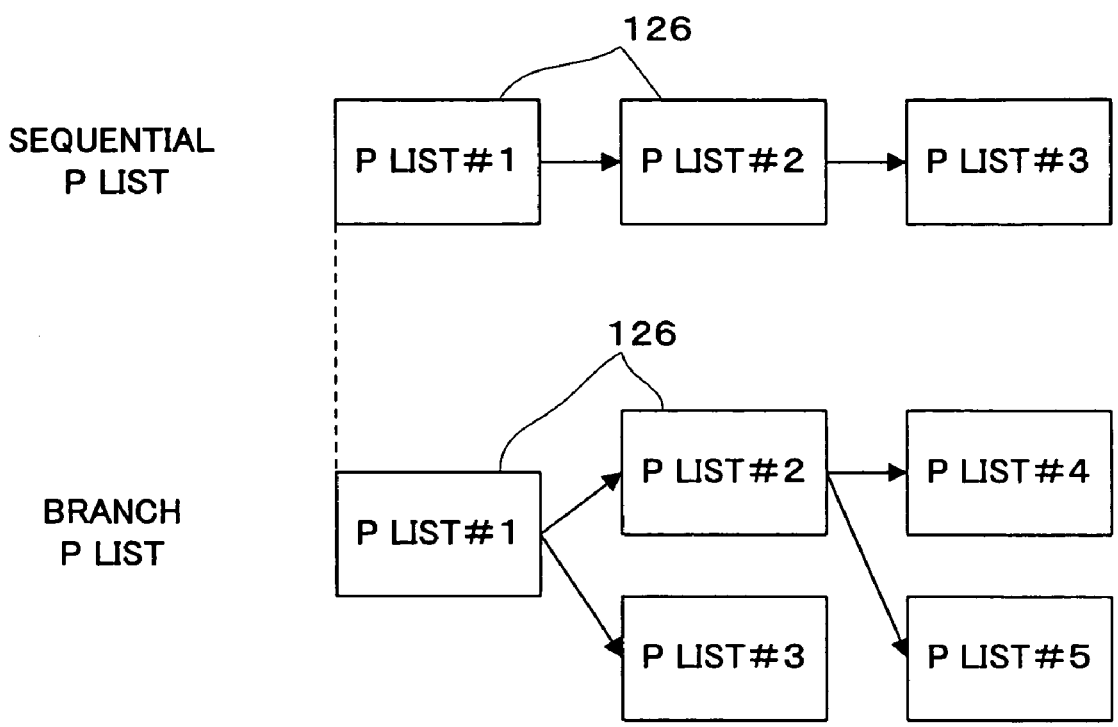
FIG. 8 is a schematic diagram showing two specific examples of the logical construction in a play list constituting one title shown in FIG. 7.

Next, the logical construction of the data on the optical disc 100 will be explained with reference to FIG. 7 and FIG. 8. FIG. 7 is a schematic diagram showing the logical construction of the data on the optical disc 100, focusing on the development of a logical hierarchy to an object hierarchy or an entity hierarchy. FIG. 8 is a schematic diagram showing two specific examples of the logical construction in the play (P) list constituting one title shown in FIG. 7.

In FIG. 7, the optical disc 100 records one or a plurality of titles 200, each of which is a logically large unit, such as one movie or one TV show. Each title 200 is logically constructed from one or a plurality of play lists 126. In each title 200, the plurality of play lists 126 may have a sequential structure or a branch structure, which will be described later with reference to FIG. 8. Incidentally, in the case of a simple logical construction, one title 200 is constructed by one play list 126. Moreover, one play list 126 can be referred to from the plurality of titles 200.

Each play list 126 is logically constructed from a plurality of Items (i.e., the play items) 204. In each play list 126, the plurality of Items 204 may have the sequential structure or the branch structure. Moreover, one Item 204 can be referred to from the plurality of play lists 126. The reproduction range of the TS object 142 is logically specified by the above described IN point information and OUT point information written in the Item 204. Then, by referring to an object information 130*d* with respect to the reproduction range logically specified, the reproduction range of the TS object 142 is physically specified. Here, the object information 130*d* includes various information to reproduce the TS object 142, such as the attribute information of the TS object 142 and EP (Entry Pass) map information 134*d* required for a data search in the TS object 142 (incidentally, the ES map table 134 shown in FIG. 3 includes a plurality of the EP map information 134*d*).

When reproducing the TS object 142 by an information recording/reproducing apparatus, which will be described later, a physical address to be reproduced in the TS object 142 is obtained from the Item 204 and the object information 130*d*, and the desired elementary stream is reproduced.

In this embodiment, as described above, the association from the logical hierarchy to the object hierarchy of the reproduction sequence is performed by the IN point information and the OUT point information described in the Item 204 and by the EP map information 134*d* described in the ES map table 134 (refer to FIG. 3) of the object information 130*d*, which enables the elementary stream to be reproduced.

Especially in this embodiment, the title 200 is classified broadly into two categories: "one play list type title" and "a plurality of play lists type title", and the latter one is further categorized into what is constructed by a "sequential play list" and what is constructed by a "branch play list".

Among them, in the title 200 constructed by "the sequential play list", the play lists #1, #2, and #3 are sequentially reproduced by simply following the time axis, as shown in the upper part of FIG. 8. In this case, the reproduction order corresponds to the play list number, and therefore, all of the play list numbers are stored in the reproduction order in the pertinent title #n information.

On the other hand, in the title 200 constructed by "the branch play list", as shown in the lower part of FIG. 8, the play list #2 or #3 is selectively reproduced following the play list #1, and further, the play list #4 or #5 is selectively reproduced following the play list #2. In this case, with regard to the reproduction order, the play list 126 to be reproduced next is determined by the branch condition when finishing the reproduction of the play lists 126 in the title. Therefore, the arrangement order of the play lists 126 in the title #n information does not correspond to the reproduction order. Only the play list 126 at the head position is specified. The branch condition is stored in the other areas. Because of this, it is possible to choose either of the play lists 126 by an audience's interactive operation, for example.

Even in the any case of the titles shown in FIG. 8, it is constructed by one or more play lists 126. Especially in this embodiment, it is possible multiplex and record a plurality of elementary streams in the unit of the TS packet 146.

As described above, in this embodiment, the multiplexing-and-recording operation is performed on the optical disc 100 in the unit of the TS packet 146, and because of this, it is possible to multiplex-and-record onto the optical disc 100 the transport stream including many elementary streams as shown in FIG. 2B. According to this embodiment, in the case of recording digital broadcasting onto the optical disc 100, a plurality of shows or programs can be recorded at the same time within the limit of the record rate. Here, it employs a method of multiplexing the plurality of shows or programs and recording them into one TS object 142. The embodiment of an information recording/reproducing apparatus executable this kind of record processing will be explained hereinafter.

Information Recording/Reproducing Apparatus

Figure 9:
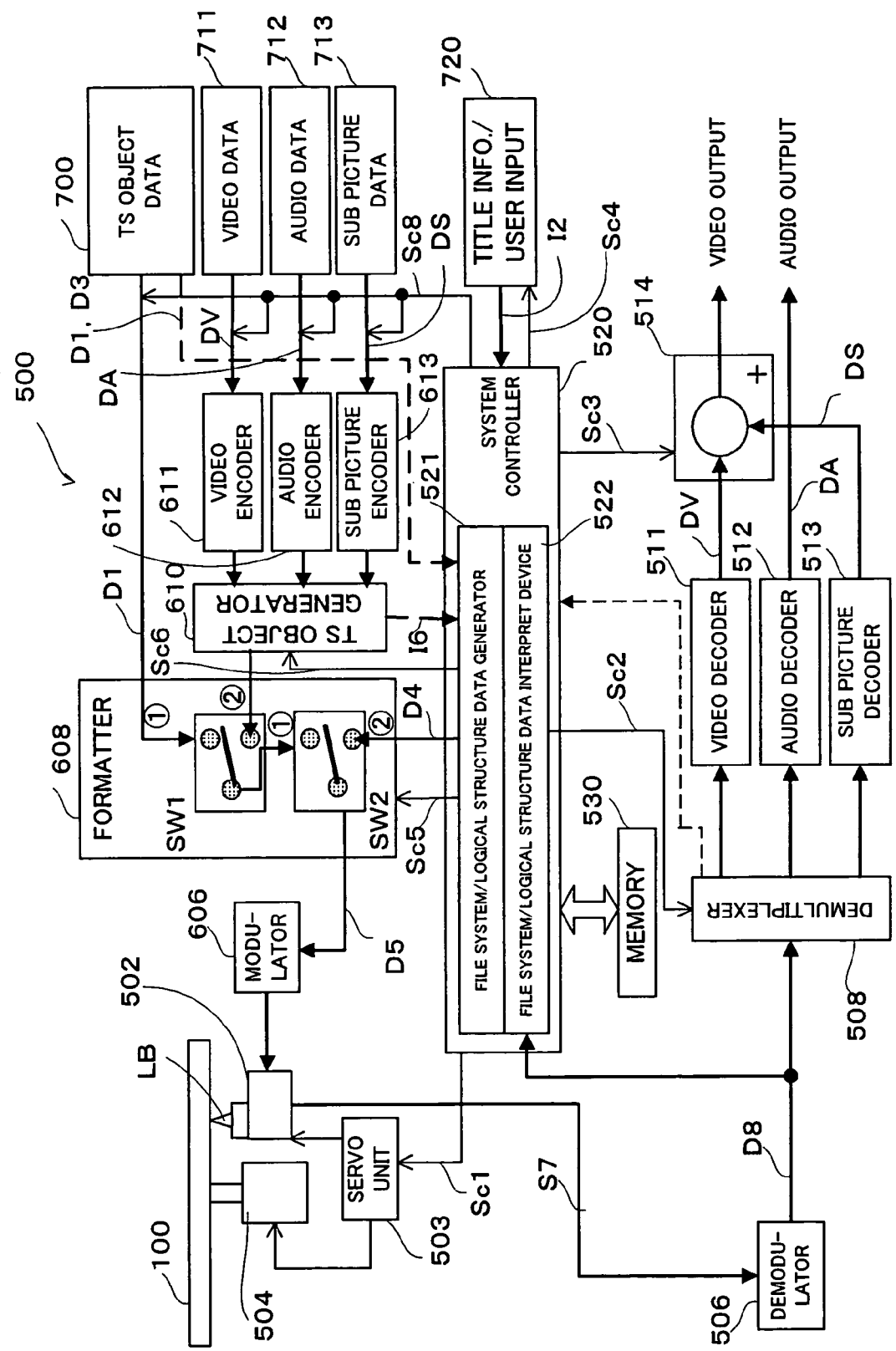
FIG. 9 is a block diagram showing an information recording/reproducing apparatus related to the embodiment of the present invention.

Next, the embodiment of the information recording/reproducing apparatus of the present invention will be explained with reference to FIG. 9 to FIG. 14. FIG. 9 is a block diagram of the information recording/reproducing apparatus, and FIG. 10 to FIG. 14 are flow charts showing its operation.

In FIG. 9, an information recording/reproducing apparatus 500 is classified broadly into a reproduction system and a record system, can record information onto the optical disc 100 described above, and can reproduce the information recorded on this. In this embodiment, the information recording/reproducing apparatus 500 is for recording and reproducing as described above, but it is possible to construct an embodiment of the recording apparatus of the present invention out of the record system part of the information recording/reproducing apparatus 500. On the other hand, it is possible to construct an embodiment of the reproducing apparatus of the present invention out of the reproduction system part of the information recording/reproducing apparatus 500.

The information recording/reproducing apparatus 500 is provided with: an optical pickup 502; a servo unit 503; a spindle motor 504; a demodulator 506; a demultiplexer 508; a video decoder 511; an audio decoder 512; a sub picture decoder 513; an adder 514; a system controller 520; a memory 530; a modulator 606; a formatter 608; a TS object generator 610; a video encoder 611; an audio encoder 612; and a sub picture encoder 613. The system controller 520 is provided with a file system/logical structure data generator 521; and a file system/logical structure data interpret device 522. Moreover, the memory 530 and a user interface 720 for the user input of the title information and the like are connected to the system controller 520.

Among these constitutional elements, the demodulator 506, the demultiplexer 508, the video decoder 511, the audio decoder 512, the sub picture decoder 513, and the adder 514 constitute the reproduction system, mostly. On the other hand, among these constitutional elements, the modulator 606, the formatter 608, the TS object generator 610, the video encoder 611, the audio encoder 612, and the sub picture encoder 613 constitute the record system, mostly. The optical pickup 502, the servo unit 503, the spindle motor 504, the system controller 520, the memory 530, and the user interface 720 for the user input of the title information and the like are shared for both the reproduction system and the record system, mostly. Moreover, a TS object data source 700, a video data source 711, an audio data source 712, and a sub picture source 713 are prepared for the record system. The file system/logical structure data generator 521 installed in the system controller 520 is mainly used in the record system, and the file system/logical structure data interpret device 522 is mainly used in the reproduction system. The optical pickup 502 irradiates a light beam LB, such as a laser beam, onto the optical disc 100 with a first power as a reading light when reproducing, and with a second power as a writing light when recording while modulating it. The servo unit 503 is controlled by a control signal Sc1 outputted from the system controller 520 when reproducing and recording, and it performs a focus servo, a tracking servo, and the like at the optical pickup 502, as well as performing a spindle servo at the spindle motor 504. The spindle motor 504 is constructed to spin the optical disc 100 at a predetermined speed while receiving the spindle servo by the servo unit 503.

(i) Configuration and Operation in Record System

Next, the specific configuration of each constitutional element constituting the record system in the information recording/reproducing apparatus 500 and their operation will be explained case by case, with reference to FIG. 9 to FIG. 13.

(i-1) The case of Using the Already Prepared TS Object

This case will be explained with reference to FIG. 9 and FIG. 10.

In FIG. 9, the TS object data source 700 is provided with a record storage, such as a video tape and a memory, and it stores TS object data D1.

Figure 10:
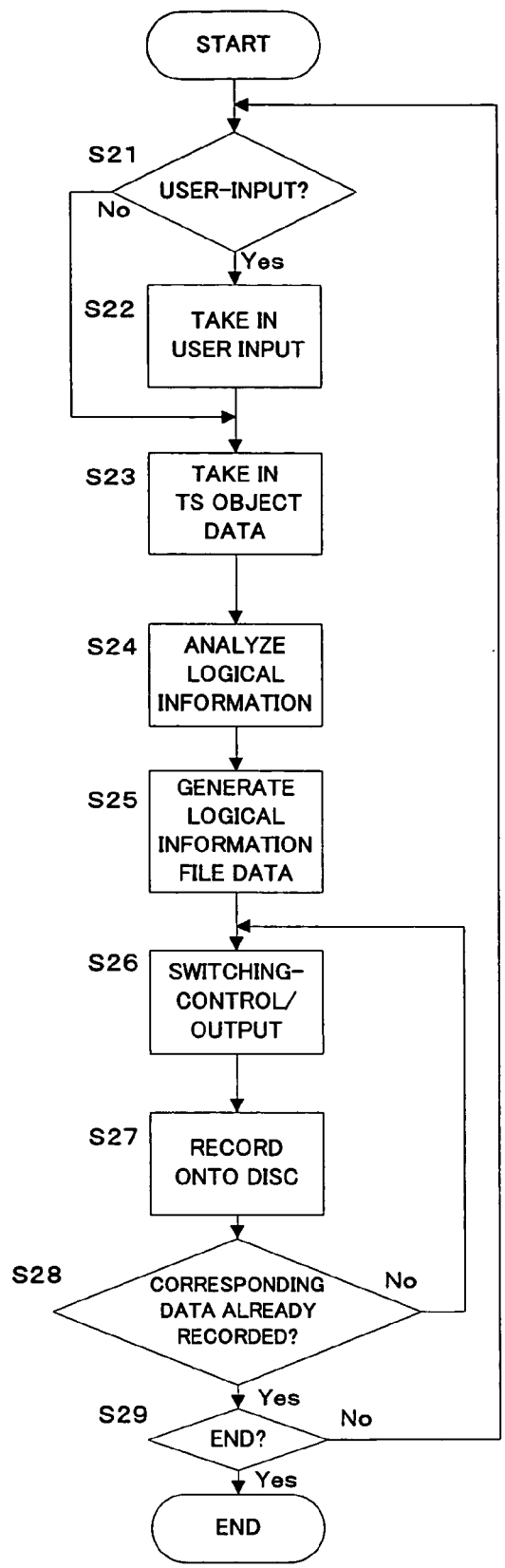
FIG. 10 is a flow chart showing a record operation (part 1) of the information recording/reproducing apparatus in the embodiment.

In FIG. 10, firstly, the information about each title (e.g. the configuration content of a program list and the like) logically constructed on the optical disc 100 using the TS object data D1 is inputted from the user interface 720 to the system controller 520, as a user input 12 of the title information and the like. Then, the system controller 520 takes in the user input 12 of the title information and the like obtained from the user interface 720 (step S21: Yes and step S22). In this case, the user interface 720 is controlled by a control signal Sc4 from the system controller 520, and it can perform input processing according to the content to be recorded, for example, choosing through a title menu screen and the like. Incidentally, in the case where the user input has been already performed or the like (step S21: No), this processing is omitted.

Then, the TS object data source 700 is controlled by a control signal Sc8 giving an instruction for reading out the data from the system controller 520, and outputs the TS object data D11 Then, the system controller 520 takes in the TS object data D1 from the TS object source 700 (step S23), and performs the analysis of the data array of the TS object data D1 (e.g. a record data length and the like), the analysis of each elementary stream configuration (e.g. understanding of ES_PID (Elementary Stream • Packet Identification number) as described later), and the like, by virtue of a TS analysis function of the file system/logical structure data generator 521, for example, on the basis of the PAT, the PMT, and the like packetized as well as the video data and the like as described above (step S24).

Then, the system controller 520 prepares the disc information file 110, the play list information file 120, the object information file 130, and the file system 105 (refer to FIG. 3), as logical information file data D4, by virtue of the file system/logical structure data generator 521, from the user input 12 of the taken-in title information and the like and from the analysis results of the data array of the TS object data D1 and each elementary stream (step S25). The memory 530 is used when preparing the logical information file data D4 described above.

Incidentally, such a variation that the data about the data array of the TS object data D1, the data about the construction information of each elementary stream, and the like are prepared in advance, is apparently and variously conceivable. Such a variation is also within the scope of the embodiment.

In FIG. 9, the formatter 608 is a device for performing a data array format to store onto the optical disc 100 the TS object data D1 and the logical information file data D4. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, connects the switch Sw2 to a ② side so as output the logical information file data D4.

In a step S26 in FIG. 10, (i) the logical information file data D4 from the file system/logical structure data generator 521 in the step S25 or (ii) the TS object data D1 from the TS object data source 700 is outputted through the formatter 608 by the switching-control by the formatter 608 as constructed above (step S26).

The selection output from the formatter 608 is transmitted to the modulator 606 as disc image data D5, is modulated by the modulator 606, and is recorded onto the optical disc 100 through the optical pickup 502 (step S27). The system controller 520 also executes the disc record control in this case.

Then, if both the logical information file data D4 generated in the step S25 and the corresponding TS object data D2 have not been completely recorded yet, the operational flow returns to the step S26, continuing to the record (step S28: No). Incidentally, there is no preference in the record order of the logical information file data D4 and the corresponding TS object data D2.

On the other hand, if the both have been already recorded (step S28: Yes), it is judged whether or not the record on the optical disc 100 is supposed to be ended, on the basis of the presence or absence of an end command (step S29). If not supposed to be ended (step S29: No), the operational flow returns to the step S21, continuing the record processing. On the other hand, if supposed to be ended (step S29: Yes), a series of record processing ends.

As described above, the information recording/reproducing apparatus 500 performs the record processing in the case of using the already prepared TS object.

Incidentally, the example in FIG. 10 shows that the logical information file data D4 and the corresponding TS object data D2 are outputted in the step S26, after preparing the logical information file data D4 in the step S25. However, it is possible to execute the output of the TS object data D2 and/or the record of the TS object data D2 onto the optical disc 100 before the step S25, and after or in parallel to this recording, to generate and record the logical information file data D4.

(i-2) The Case of Receiving and Recording the Transport Stream on Air

Figure 11:
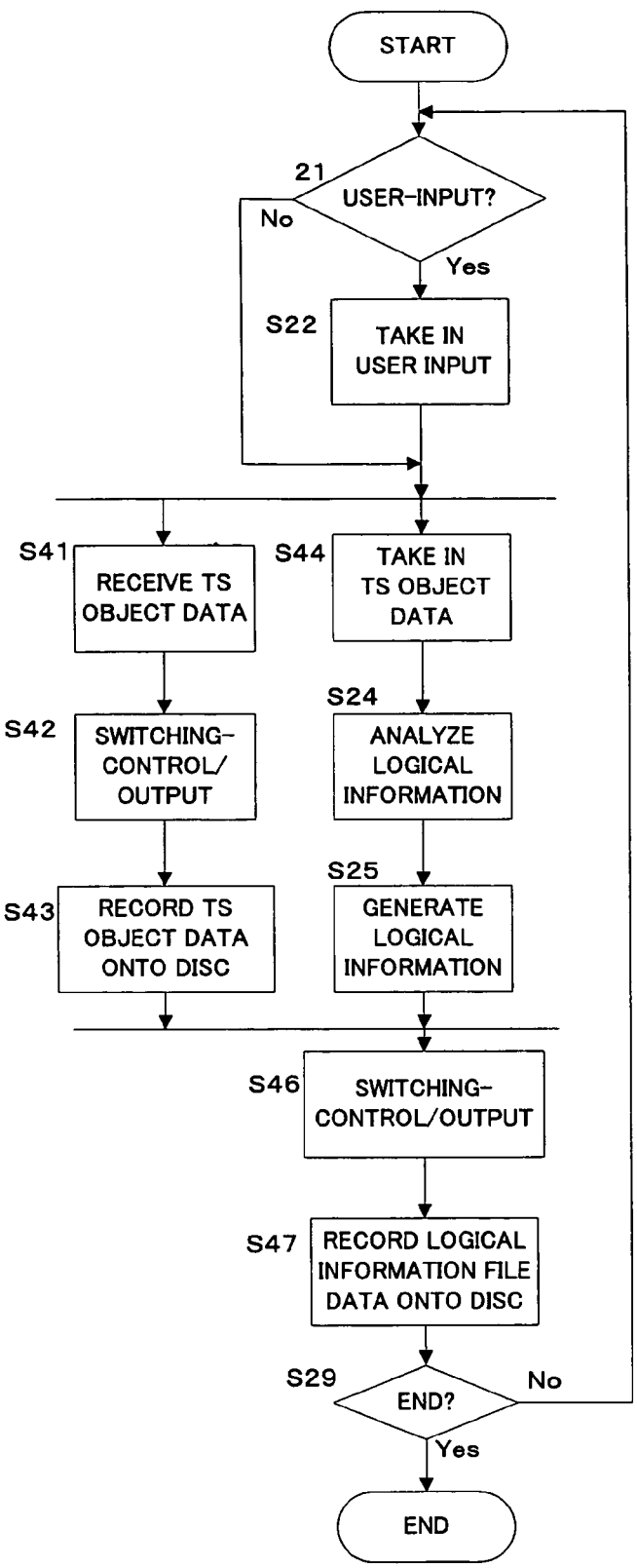
FIG. 11 is a flow chart showing a record operation (part 2) of the information recording/reproducing apparatus in the embodiment.

This case will be explained with reference to FIG. 9 and FIG. 11. Incidentally, in FIG. 11, the same steps as those in FIG. 10 have the same step reference numbers, and their explanation will be omitted as occasion demands.

Again, in this case, the similar processing is performed, as is "the case of using the already prepared TS object" described above. Focusing on the differences from this case, the explanation will be done hereinafter.

In the case of receiving and recording the transport stream on air (i.e. the transport stream being broadcasted), the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the ES_PID information, as described later, which are deciphered upon receiving is taken into the system controller 520 and is stored into the memory 530 (step S44).

In the meantime, the TS object data D1 outputted to the formatter 608 is outputted to the modulator 606 by the switching-control of the formatter 608 (step S42), and is recorded onto the optical disc 100 (step S43).

Along with these operations, using the program construction information and the ES_PID information included in the reception information D3 taken-inupon receiving and stored in the memory 530, the file system/logical structure data generator 521 prepares the logical information file data D4 (step S24 and step S25). Then, after completing the record of a series of the TS object data D1, this logical information file data D4 is additionally recorded onto the optical disc 100 (step S46 and step S47). Incidentally, these step S24 and step S25 may be performed after the step S43.

Moreover, as the occasion demands (e.g. in the case of editing one portion of the title, or the like), by adding the user input 12 of the title information and the like from the user interface 720 to the program construction information and the ES_PID information stored in the memory 530, it is possible to prepare the logical information file data D4 by the system controller 520 and additionally record this onto the optical disc 100.

As described above, the information recording/reproducing apparatus 500 performs the record processing in the case of receiving the transport stream on air and recording it in real time.

Incidentally, if all the reception data obtained when broadcasting is once stored into an archive apparatus, and then, if this is used as the TS object source 700, the same processing as that in "the case of using the already prepared TS object" will do.

Figure 12:
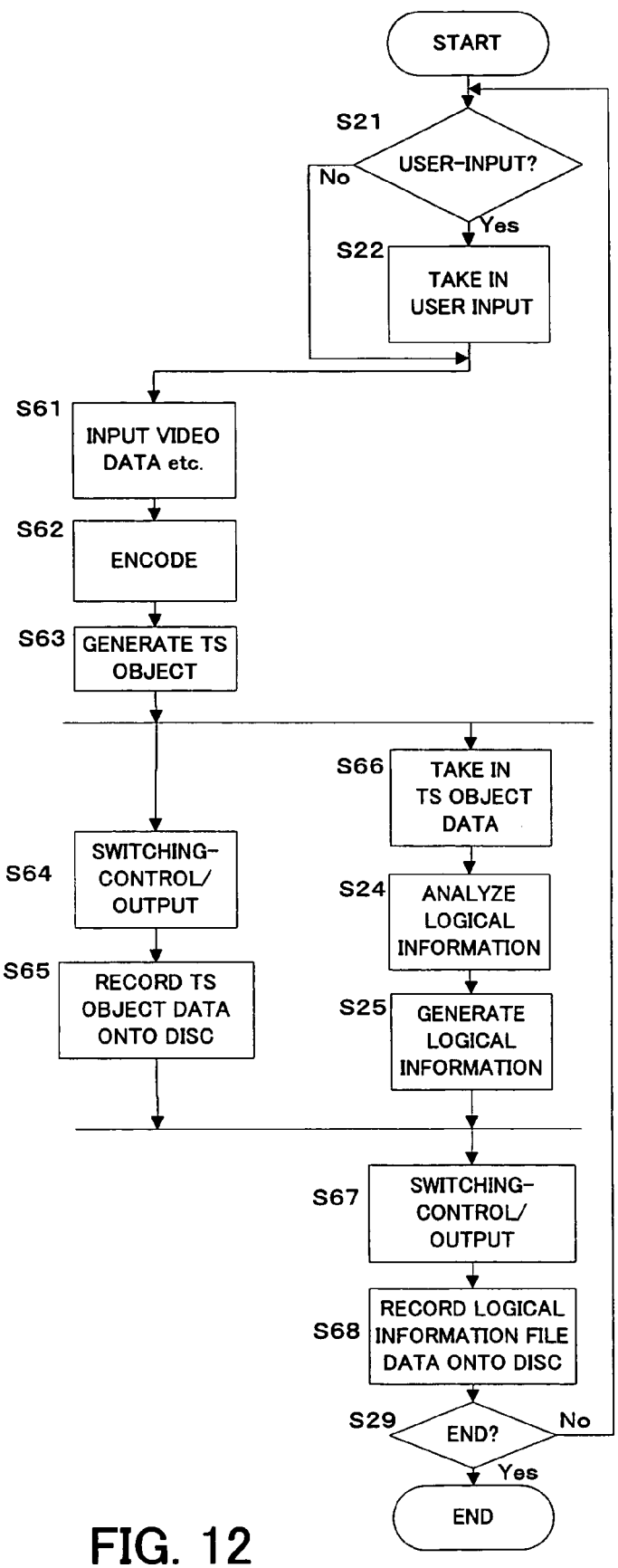
FIG. 12 is a flow chart showing a record operation (part 3) of the information recording/reproducing apparatus in the embodiment.

(i-3) The Case of Recording the Video Data, the Audio Data, and the Sub Picture Data This case will be explained with reference to FIG. 9 and FIG. 12. Incidentally, in FIG. 12, the same steps as those in FIG. 10 have the same step reference numbers, and their explanation will be omitted as occasion demands.

In the case of recording the video data, the audio data, and the sub picture data, which are individually prepared in advance, the video data source 711, the audio data source 712, and the sub picture data source 713 are individually provided with the record storage, such as a video tape and a memory, and store a video data DV, an audio data DA, and a sub picture data DS, respectively.

These data sources are controlled by the control signal Sc8 giving an instruction for reading out the data from the system controller 520, and they transmit the video data DV, the audio data DA, and the sub picture data DS, to the video encoder 611, the audio encoder 612, and the sub picture encoder 613, respectively (step S61). Then, the video encoder 611, the audio encoder 612, and the sub picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information (e.g. a record data length and the like) of each TS object data and the construction information of each elementary stream (e.g. the ES_PID, as described later, and the like)

are transmitted from the TS object generator 610 as information 16 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to change the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream taken into the memory 530 as the information 16, the file system/logical structure data generator 521 prepares the logical information file data D4 (step S24 and step S25). Then, after completing the record of a series of the TS object data D1, this is additionally recorded onto the optical disc 100 (step S67 and step S68). Incidentally, the step S24 and the step S25 may be processed after the step S65.

Moreover, as the occasion demands (e g. in the case of editing a part of the title), by adding the user input 12 such as the title information and the like form the user interface 720 onto these information stored in the memory 530, it is possible to prepare the logical information file data D4 with the file system/logical structure generator 521 and additionally record this onto the optical disc 100.

As described above, the information recording/reproducing apparatus 500 performs the record processing in the case of the recording the video data, the audio data, and the sub picture data, which are individually prepared in advance.

Incidentally, this record processing is applicable even when recording an arbitrary content the user has.

(i-4) The Case of Recording the Data by Authoring

Figure 13:
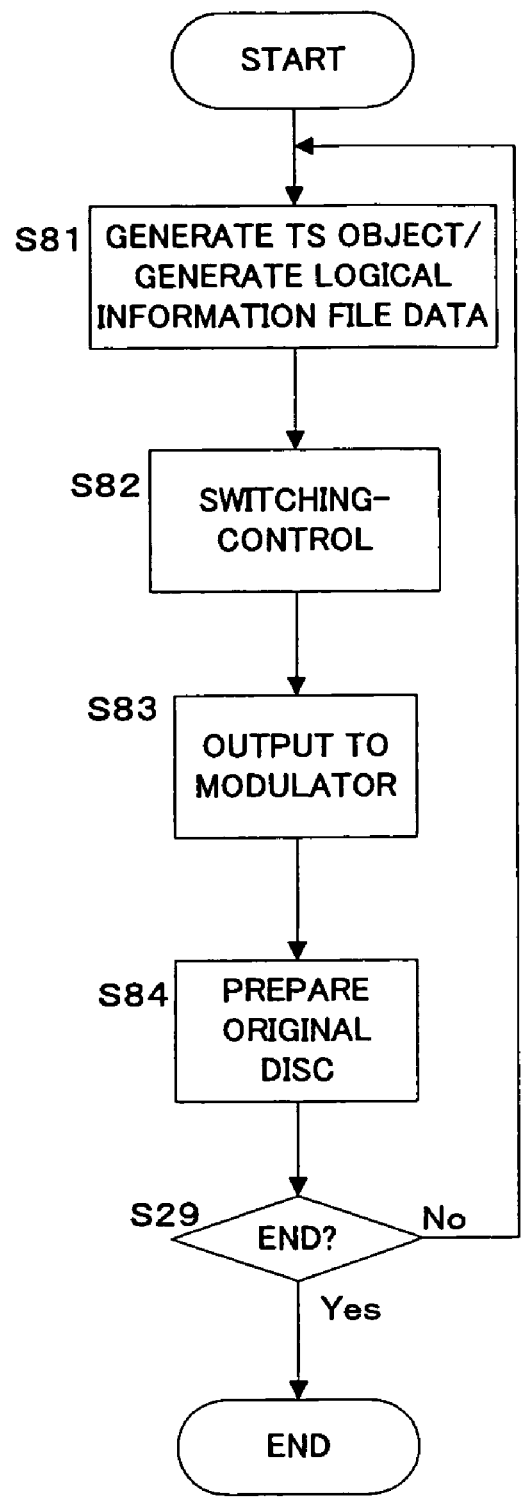
FIG. 13 is a flow chart showing a record operation (part 4) of the information recording/reproducing apparatus in the embodiment.

This case will be explained with reference to FIG. 9 and FIG. 13. Incidentally, in FIG. 13, the same steps as those in FIG. 10 have the same step reference numbers, and their explanation will be omitted as occasion demands.

In this case, by combining the above described three types of record processing in the three cases, an authoring system generates the TS object, the logical information file data, and the like in advance (step S81), and then completes the processes until the switching-control process at the formatter 608 (step S82). Then, the information obtained by this operation is transmitted to the modulator 606 equipped in front of and/or behind an original disc cutting machine, as the disc image data D5 (step S83), and this cutting machine prepares the original disc (step S84).

(ii) Configuration and Operation in Reproduction System

Next, the specific configuration of each constitutional element constituting the reproduction system in the information recording/reproducing apparatus 500 and their operations will be explained with reference to FIG. 9 and FIG. 14.

The user interface 720 inputs the title to be reproduced, its reproduction condition, and the like to the system controller 520 as the user input 12 such as the title information and the like. In this case, the user interface 720 is controlled by the control signal Sc4 from the system controller 520, and it can perform the input processing according to the content to be reproduced, such as choosing through a title menu screen.

Responding to this, the system controller 520 controls the disc reproduction with respect to the optical disc 100, and the optical pickup 502 transmits a reading signal S7 to the demodulator 506.

The demodulator 506 demodulates a recorded signal recorded on the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. Based on this logical information file data, the system controller 520 executes various reproduction control, such as processing of determining a reproduction address and controlling the optical pickup 502.

On the other hand, as for the TS object data included in the demodulated data DS as being a multiplexed information part, the demultiplxer 508 is controlled by a control signal Sc2 from the system controller 520 to demultiplex the TS object data. Here, the control signal Sc2 is transmitted so as to start demultiplexing when completing accessing a reproduction position address by the reproduction control of the system controller 520.

The demultiplexer 508 transmits and supplies the video packet, the audio packet, and the sub picture packet, to the video decoder 511, the audio decoder 512, and the sub picture decoder 513, respectively. Then, the video data DV, the audio data DA, and the sub picture data DS are respectively decoded.

Incidentally, the packets included in the transport stream, in each of which the PAT or the PMT is packetized as shown in FIG. 6, are respectively included as a part of the demodulated data D8; however, they are cleared (i.e., discarded or abandoned) at the demultiplexer 508.

The adder 514 is controlled by a control signal Sc3 giving an instruction of the mixing from the system controller 520, and mixes or superimposes in a predetermined timing the video data DV and the sub picture data DS, which are respectively decoded at the vide decoder 511 and the sub picture decoder 513 The result is outputted as a video output from the information recording/reproducing apparatus 500 to a TV monitor, for example.

On the other hand, the audio data DA decoded at the audio decoder 512 is outputted as an audio output from the information recording/reproducing apparatus 500 to an external speaker, for example.

Here, the specific example of a reproduction processing routine by the system controller 520 will be explained with reference to FIG. 14.

Figure 14:
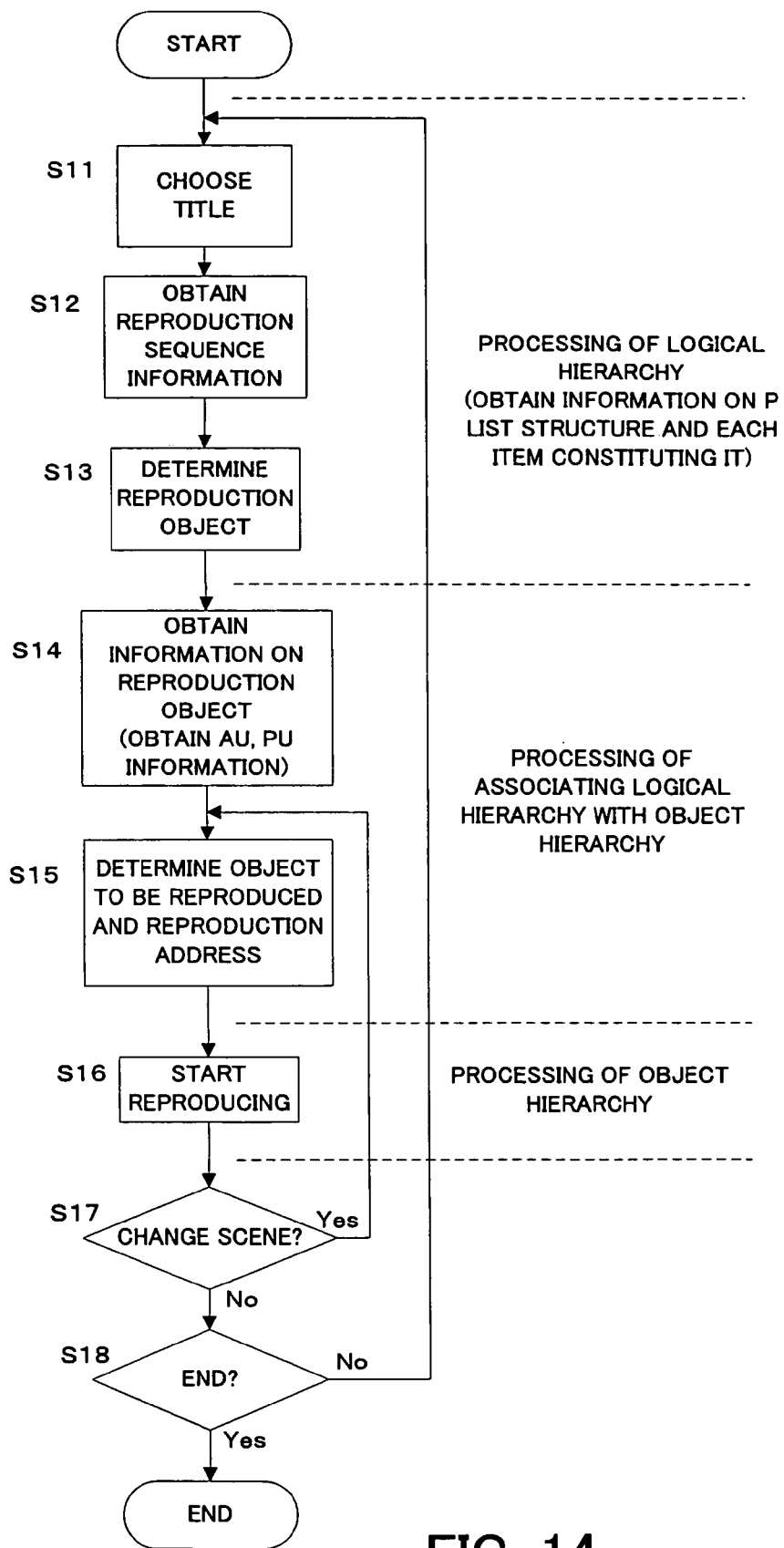
FIG. 14 is a flow chart showing a reproduction operation of the information recording/reproducing apparatus in the embodiment.

In FIG. 14, assume that as an initial condition, the recognition of the optical disc 100 in the reproduction system and the recognition of a volume structure and a file structure by the file system 105 (refer to FIG. 3) have been already completed by the system controller 520 and the file system/logical structure data interpret device 522 inside the system controller 520. Here, it will be explained the operational flow after obtaining the total number of the total titles from the disc comprehensive information 112 in the disc information file 110 and then choosing or selecting one title from among them.

Firstly, the choice or selection of the title is performed at the user interface 720 (step S11), and the system controller 520 obtains the information about the reproduction sequence from a reading result of the file system/logical structure data interpret device 522. More specifically, it obtains the information indicating the process play list structure of the logical hierarchy and the information of Item or Items constituting the process play list structure (refer to FIG. 7) (step S12). By this, a reproduction object is determined (step S13).

Then, the object information file 130 related to the TS object as being the reproduction object is obtained. Especially in the embodiment, the AU information 132I and PU (Presentation Unit) information 302I, which will be described later, are also obtained as the information stored in the object information file 130 (step S14). These obtained information allow the association or correlation of the above described logical hierarchy and the object hierarchy (refer to FIG. 7).

Then, based on the information obtained in the step S14, the object to be reproduced and the reproduction address are determined (step S15), and then the processing of the object hierarchy is started; namely, the actual reproduction is started (step S16).

While reproducing, it is monitored whether or not the command-input of a "scene change" corresponding to the change of the PU 302 in the AU 132 based on the PU information 3021 and the AU information 132I, as described later is performed (step 817). If the "scene change" is command-inputted (step S17: Yes), the operational flow returns to the step S15, and the processes from the step S15 to the step S17 are repeatedly executed. On the other hand, if the "scene change" is not command-inputted (step S17: No), the presence or the absence of the command input indicative of ending the reproduction processing is judged (step S18). If there is not the command input indicating of ending (step S18: No), the operational flow returns to the step S11, and the processes inform the step S11 to the step 818 are repeatedly executed. On the other hand, if there is the command input indicative of ending (step S18:Yes), a series of the reproduction processing ends.

Access Flow in Reproducing

Figure 15:
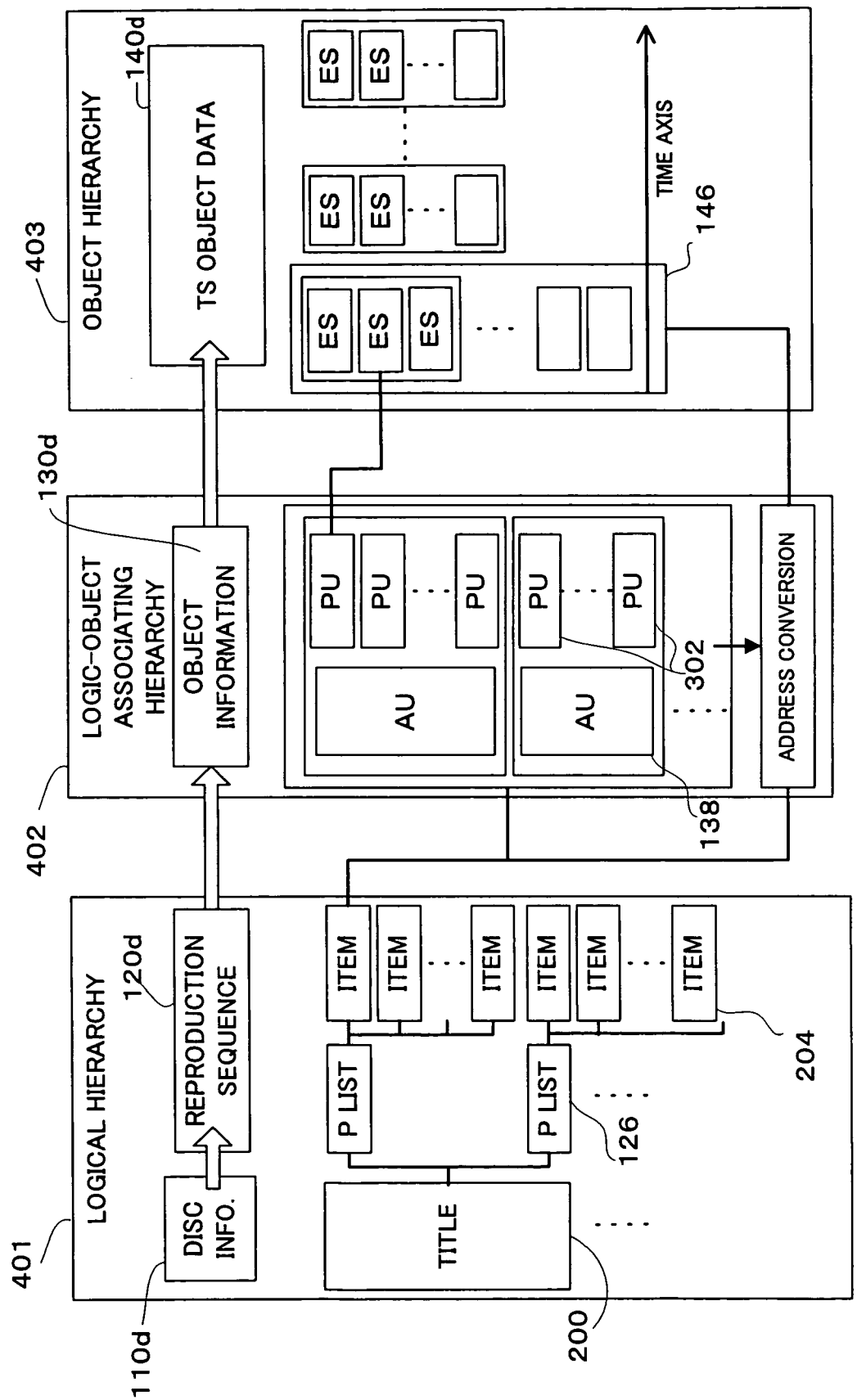
FIG. 15 is a schematic diagram showing an entire access flow in reproducing, in relation to the logical structure of the optical disc in the embodiment.

Next, the flow of the access in reproducing at the information recording/reproducing apparatus 500, which uses the AU information 132I and the PU information 3021, as one of the features of this embodiment, will be explained as well as the logical structure of the optical disc 100. FIG. 15 is a schematic diagram showing an entire flow of the access in reproducing, in relation to the logical structure of the optical disc 100.

In FIG. 15, the logical structure of the optical disc 100 is categorized broadly into the following three hierarchies: a logical hierarchy 401; an object hierarchy 403; and a logic-object associating hierarchy 402 mutually associating those two hierarchies.

Among them, the logical hierarchy 401 is a hierarchy that logically specifies various logical information to reproduce the desired title when reproducing, as well as the play list and its construction content to be reproduced. In the logical hierarchy 401, disc information 110d indicating the entire titles 200 and the like on the optical disc 100 is written within the disc information file 110 (refer to FIG. 3), and further, reproduction sequence information 120d of the entire contents on the optical disc 100 is written within the play list information file 120 (refer to FIG. 3). More specifically, the construction of one or a plurality of play lists 126 is written in each title 200 as the reproduction sequence information 120d, and the construction of one or a plurality of Items 204 is written in each play list 126. Then, in accessing at the time of the reproduction, the logical hierarchy 401 as described above specifies the title 200 to be reproduced, the play list 126 corresponding to this, and further the Item 204 corresponding to this.

Then, the logic-object associating hierarchy 402 is a hierarchy that specifies the attribute and the physical storing address of the TS object data 140d to be reproduced, so as to specify the combination and/or the construction of the TS object data 140d as being the entity data and perform an address conversion to the object hierarchy 403 from the logical hierarchy 401, on the basis of the information specified in the logical hierarchy 401 as described above. More specifically, in the logic-object associating hierarchy 402, the object information data 130d, which separates a group of the contents constituting each Item 204 into the units of the AU 132 and which finely separates each AU 132 into the units of the PU 302, is written in the object information file 130 (refer to FIG. 3).

Here, "the PU (Presentation Unit) 302" is one example of "a sub group" in the present invention, and is a unit of associating and grouping a plurality of elementary streams in the unit of changing the reproduction. For example, as is the title #1 in the specific examples shown later in FIG. 16 to FIG. 22, the PU 302 is a unit of grouping the elementary stream packet ID (ES_PID) and the like for each vision of a "multi-vision title". If there are three audio streams in this PU 302, the user can also freely change three audio (e.g. language types of audio and the like) while reproducing this vision.

On the other hand, "the AU (Associate Unit) 132" is a unit of associating or grouping a plurality of elementary streams, such as the video stream, in the TS object used in one title, and is a group of one or a plurality of PUs 302. More specifically, the AU 132 is a unit of grouping the elementary stream packet ID (ES_PID) for each TS object, indirectly through the PU 302. This AU 132 corresponds to a group of a plurality of shows or programs mutually having a special relationship considering the contents, for example, a plurality of shows or programs mutually changeable in multiple broadcasting and the like. Then, the PU 302 corresponds to a group of one or a plurality of elementary streams, which belong to the same AU 132 and which constitute a plurality of shows or programs mutually changeable by the user operation when reproducing.

Therefore, if the AU 132 to be reproduced is specified, and moreover, the PU 302 is specified, then the elementary stream to be reproduced is specified. Namely, even if not using the PAT nor the PMT shown in FIG. 6, it becomes possible to reproduce the desired elementary stream from among the multiple-recorded elementary streams from the optical disc 100.

The more specific data structure of the AU information 132I and the PU information 302I, which respectively determine the AU 132 and the PU 302 described above, will be explained later with reference to FIG. 25.

Here, the elementary stream that is actually reproduced is specified or designated by the ES_PID, which is the packet ID of the elementary stream (refer to FIG. 6), from the PU information 302I. At the same time, by converting the information indicating the starting time and the ending time of the reproduction to the address information of the elementary stream, the content in a specific area (or specific time range) of a specific elementary stream is reproduced.

In this manner, in the logic-object associating hierarchy 402, the address conversion to the physical address related to each PU 302 from the logical address related to each Item 204 is executed.

Then, the object hierarchy 403 is a physical hierarchy to reproduce the actual TS object data 140d. In the object hierarchy 403, the TS object data 140d is written within the object data file 140 (refer to FIG. 3). More specifically, the TS packets 146 constituting a plurality of elementary streams (ES) are multiplexed each time point, and the arrangement of the TS packets 146 along the time axis enables a plurality of elementary streams to be constituted (refer to FIG. 5). Then, the plurality of TS packets 146 multiplexed each time point are associated with the PU 302 specified at the logic-object associating hierarchy 402, for each elementary stream. Incidentally, it is also possible to associate a plurality of PUs 302 with one elementary stream (e.g. to share the elementary stream related to the same audio data and/or the elementary stream related to the same sub picture data, among a plurality of changeable shows or programs).

In this manner, in the object hierarchy 403, the actual object data is reproduced using the physical address obtained by the conversion at the logic-object associating hierarchy 402.

As described above, the three hierarchies shown in FIG. 15 allows the access with respect to the optical disc 100 in reproducing to be executed.

Specific Example of Data Structure Recorded on Optical Disc

Next, with reference to FIG. 16 to FIG. 21, the data structure on the optical disc 100 on which the AU (Associate Unit) information and the PU (Presentation Unit) information, as one of the features of this embodiment, are recorded will be explained, in addition to the PAT (Program Association Table) and the PMT (Program Map Table), as one of the features of the transport stream.

Figure 16:
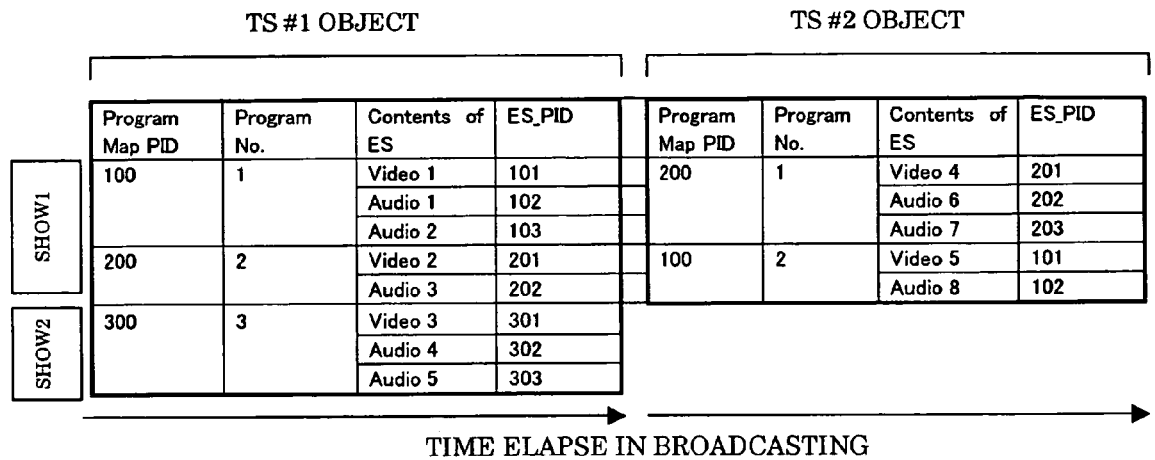
FIG. 16 is a schematic diagram showing the data structures of TS objects #1 and #2 including a plurality of transport streams in one specific example of the embodiment.
Figure 17:
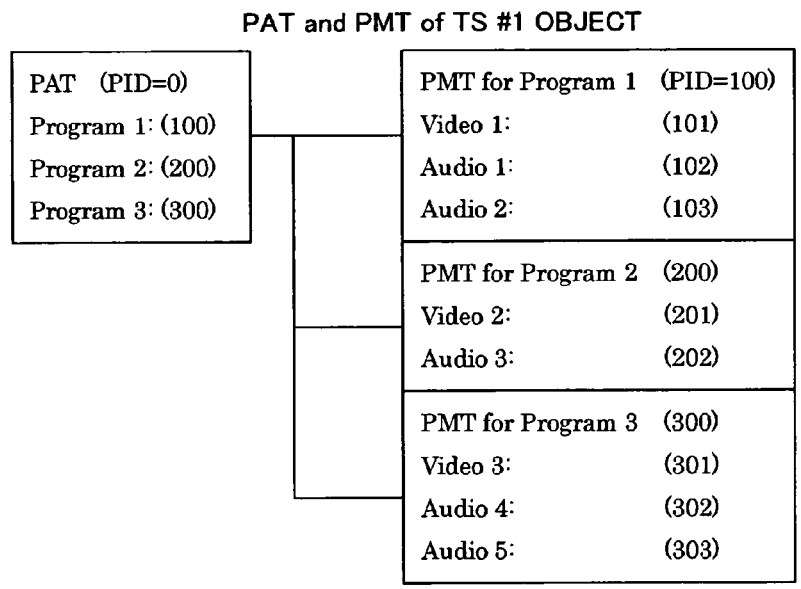
FIG. 17 is a schematic diagram showing the data structures of PAT and PMT of the TS object #1 in one specific example of the embodiment.

In this specific example, it will be explained the data structure constructed on the optical disc. 100 in the case of constructing two titles within the optical disc 100 with respect to the object provided with the three TS objects #1, #2, and #3. FIG. 16 is a schematic diagram showing the data structures of TS objects #1 and #2 including a plurality of elementary streams in this specific example. FIG. 17 is a schematic diagram showing the data structures of the PAT and the PMT of the TS object #1 in this specific example. FIG. 18 is a schematic diagram showing the data structures of PAT and PMT of the TS object #2 in this specific. FIG. 19 is a schematic diagram showing the data structure of the TS object #3 in this specific example. FIG. 20 is a schematic diagram showing the data structures of PAT and PMT of the TS object #3 in this specific example. FIG. 21 is a schematic diagram showing the data structure finally constructed on the optical disc 100 in this specific example.

Firstly, as shown in FIG. 16, the title #1 is constructed by using the TS #1 object and the TS #2 object as they are, with the transport stream that is used in digital broadcasting as those two TS objects 142 (refer to FIG. 3). The "show 1" in FIG. 16 is the binary broadcasting which uses two programs, whose program map packet IDs ("Program Map PIDs") are "100" and "200" that have program numbers ("Program No" in FIG. 16) "1" and "2", respectively. On the other hand, the "show 2" in FIG. 16 is normal broadcasting which uses one program, whose program map packet ID is "300" that has a program number "3". For example, the elementary stream (ES) corresponding to the program whose program number is "1" is "Video 1 (video stream 1)", "Audio 1 (audio stream 1)", and "Audio 2 (audio stream 2)". Their elementary stream packet IDs (ES_PID) are "101", "102", and "103", respectively (refer to FIG. 6). The other contents of the elementary stream (ES) and the packet ID (ES_PID) are as shown in FIG. 16.

In this specific example as shown in FIG. 17, the TS #1 object is constructed such that one PAT can specify three PMTs and that each PMT can specify each TS packet of the elementary stream to be reproduced, with respect to the PAT and the PMT at the time of broadcasting.

More specifically, the packet ID (PID) of the PAT is set to a defined value such as "000", and because of this, it is possible to firstly specify or determine the PAT from among many packets (refer to FIG. 6) multiplexed each time point. Moreover, referring to the contents of the specified PAT, it is possible to specify the PMTs from among many packets (refer to FIG. 6) multiplexed each time point by use of the packet ID) of the PMT for the "Program 1" (e.g. "100"), the packet ID of the PMT for the "Program 2" (e.g. "200"), or the packet ID of the PMT for the "Program 3" (e.g. "300").

Moreover, referring to the contents of the PMT as specified above can specify the TS packet whose content to be reproduced is packetized, from among many packets multiplexed each time point (refer to FIG. 6). For example, in the case where the PMT for the "program 1" is specified, it is possible to specify the TS packet by use of the packet ID of the TS packet for the "video stream 1" (e.g. "101"), the packet ID of the TS packet for the "audio stream 1" (e.g. "102"), or the packet ID) of the TS packet for the "audio stream 2" (e.g. "103"). Moreover, as is the case where the PMT for the "program 2" and the PMT for the "program 3" are specified, the TS packet to be reproduced can be specified.

Especially, in this specific example, a group of data constituting a series of transport streams used for broadcasting (e.g. a sequentially broadcasted unit without CM (commercial) and the like) is treated as the "TS object" (refer to FIG. 3). Here, it is assumed that, firstly at the time of broadcasting, two shows are transmitted by using the TS #1 object as three programs, the "show 2" ends as time elapses, and after a commercial, the "show 1" is broadcasted by using the TS #2 object. Therefore, its program sequence is changed in the middle.

Furthermore, in this specific example as shown in FIG. 18, the TS #2 object is constructed such that two PMTs can be specified by one PAT and that each TS packet of the elementary stream to be reproduced can be specified by each PMT, with respect to the PAT and the PMT at the time of broadcasting.

As shown in FIG. 15 to FIG. 18, in this specific example, one title #1 is constituted by the TS #1 object and the TS #2 object as they are at the time of broadcasting, in which the CM contents are omitted.

Moreover, as shown in FIG. 19, the title #2 is constructed by using the TS #3 object in this specific example. The authoring operation is applied onto this TS object #3 so as to preliminarily store the TS object #3 as ROM contents. The TS object #3 is provided with the elementary streams for the video data and for the audio data, and especially, two elementary streams for the sub picture data (i.e. "Sub picture 1" and "Sub picture 2" as the contents of the ES in FIG. 19).

In this specific example, as shown in FIG. 20, the TS #3 object constituting the title 2 has the simply constructed PAT and PMT.

FIG. 21 shows the summary of the data structure constructed on the optical disc 100, which has been explained with reference to FIG. 15 to FIG. 20.

In FIG. 21, the data structure where the two titles are composed of three TS objects is constructed on the optical disc 100. Especially, the "show 1", which is binary-broadcasted, is logically reconstructed on the optical disc 100 as the title of a "multi vision" type (i.e. the type with which a user can freely change to watch) similar to the "angle change" of the DVD. In this change, this title does not use the audio stream "Audio 1" of the TS #1 object or the audio stream "Audio 6" of the TS #2 object, and further it does not use the elementary stream of the "show 2".

Each Information File Structure

Next, with reference to FIG. 22 to FIG. 25, various information files constructed on the optical disc 100 in the embodiment, i.e. the data structures of (1) the disc information file 110, (2) the play list information file 120, (3) the object information file 130, and (4) the object data file 140, which have been explained with reference to FIG. 3, will be explained using their own specific examples.

(1) Disc Information File:

Firstly, with reference to FIG. 22 and FIG. 23, the disc information file 110 will be explained in detail using one specific example. FIG. 22 is a schematic diagram showing one specific example of the data structure of the disc information file 110. FIG. 23 is a schematic diagram showing one specific example of the data structure of the title information table 114 included in the disc information file 110.

In this specific example as shown in FIG. 22, the disc information file 110 stores therein the disc comprehensive information 112, the title information table 114, and the other information 118.

Among them, the disc comprehensive information 112 is comprehensive information, such as disc volume information indicating the serial number of one series constructed by a plurality of optical discs 100, total title number information and so on.

The title information table 114 stores therein the entire play lists constituting each title and the other information, e.g. information for each title, such as chapter information within the title and the like, and includes title pointer information, title #1 information, title #2 information, and so on. Here, the "title pointer information" is the storing address information of the title #n information, i.e. the storing address information indicating the storing position of the title #n information in the title information table 114, as the correspondence relationship is indicated with arrows in FIG. 22, and the "title pointer information" is written with a relative logical address. Then, this information of the number of titles in the optical disc 100 is arranged in the order of the titles as the relative logical address. Incidentally, the data amount of each storing address information may be a fixed byte or a changeable byte.

The other information 118 is information about each title, such as the title type, for example, the sequential type, the branch type, and the like, which have been already explained with reference to FIG. 8, and the total number of play lists.

Incidentally, in the specific example shown in FIG. 16 to FIG. 21, the both titles are individually constructed by simply one play list title. Therefore, in the case of this specific example, the title information table 114 stored in the disc information file 110 shown in FIG. 22 is written as a table having relatively simple contents as shown in FIG. 23.

(2) Play List Information File:

Next, with reference to FIG. 24, the play list information file 120 will be explained in detail using one specific example. FIG. 24 is a schematic diagram showing one specific example of the data structure on the play list information table 121 constructed in the play list information file 120.

In this specific example, as shown in FIG. 24, the play list information file 120 stores therein play list comprehensive information 122, a play list pointer table 124, and a play list #1 information table and a play list #2 information table 126, for each Field type, as the play list information table 121 (refer to FIG. 3).

Each Field may have a structure that allows the necessary number of each table to be added. For example, if there are four play lists, the relative Field may increase to four Fields under this structure, and so does the Item information table.

Among them, the play list comprehensive information (P list comprehensive information) 122 describes therein the size of the play list table, the total number of play lists, and the like.

The play list pointer table (P list pointer table) 124 stores therein the address of each play list written position as being the relative logical address in the play list information table 126, as the correspondence relationship is indicated with arrows in FIG. 24.

The play list #1 information table (P list #1 information table) 126 stores therein comprehensive information about the play list #1, the Item information table of the play list #1 (P list Item information table) and the other information. The play list #2 information table 126 also stores therein the same type of information related to the play list #2.

The "Item information table" stores therein the Item information of the total number of Items constituting one program list. Here, an AU number in the AU (Associate Unit) table written in the "Item #1 (Item #1 information)" or the "Item #2 (Item #2 information)" is the number of the AU, which stores information for specifying the address of the TS object to be used for the Item reproduction, or specifying each elementary stream (i.e. the video stream, the audio stream, or the sub picture stream) in the TS object to be used for the Item reproduction.

(3) Object Information File:

Next, with reference to FIG. 25, the object information file 130 will be explained in detail using one specific example. FIG. 25 is a schematic diagram showing one specific example of the data structures on the AU table 131 (refer to FIG. 3) constructed in the object information file 130 and on the ES map table 134 (refer to FIG. 3) related to the AU table 131.

In this specific example, as shown in FIG. 25, the object information file 130 stores therein object information tables. The object information tables comprise the AU table 131 shown in the upper part of FIG. 25 and the ES map table 134 shown in the lower part.

In the upper part of FIG. 25, the AU table 131 may have a structure that allow the necessary number of tables for each Field to be added. For example, if there are four AUs, the relative Field may increase to four Fields under this structure.

The AU table 131 stores therein "AU table comprehensive information" in which the number of AUs and the pointer to each AU, and the like are written, and "the other information."

The AU table 131 describes therein the Index number (Index number= . . . ) of the corresponding ES map table 134, as the AU information 132I indicting an ES table Index #m in each PU #m corresponding to each AU #n. Here, the "AU" is a unit corresponding to a "show" in TV broadcast, for example, as mentioned above (especially, in the case of "multi-vision" broadcasting, it is a unit of a group of a plurality of "visions" which are changeable or selectable), and it includes one or more PUs, each of which is a reproduction unit. Moreover, the "PU" is a set of mutually changeable elementary streams which are included in each AU, as described above, and the ES table Index #m corresponding to each PU is specified by the PU information 302I. For example, in the case of constructing multi-view contents with the AU, the AU stores therein a plurality of PUs, and each PU stores therein the pointers to a plurality of elementary stream packet IDs, which indicate the packets constituting the content of each view. This indicates the Index number in the ES map table 134, as described later.

In the lower part of FIG. 25, the ES map table 134 stores therein ES map table comprehensive information, a plurality of Indexes #m (m=1, 2, . . . ), and the "other information", for each Field.

The "ES map table comprehensive information" describes therein the size of the ES map table, the total number of Indexes, and the like.

The "Index #m" includes the elementary stream packet IDs (ES_PIDs) of the entire elementary streams to be used for the reproduction, the corresponding Index numbers, the address information of the elementary stream.

Constructed as described above, it is possible to obtain the elementary stream packet ID (ES_PID) of the actual elementary stream from the Index number of the ES map 134 specified from the AU table 131. Moreover, since the address information of the elementary stream corresponding to the elementary stream packet ID can be obtained at the same time, it is possible to reproduce the object data on the basis of these information.

According to the data structure of the optical disc 100 explained above, even in the case of adding a new title to the optical disc 100, necessary information can be added easily, which is useful. On the other hand, even if some information becomes unnecessary as a result of editing or the like, for example, what is to be done is simply not to refer to the information, and it is not necessary to actually delete the information from the table, which is useful, as well.

Incidentally, in FIG. 25, even the ES_PID that is not referred to from the AU table 131 in the upper part is described by the Index of the ES map table 134 in the lower part; however, it is not necessary to describe the ES_PID that is not referred to, in this manner. If the more versatile ES map table 134 is prepared in advance by describing the ES_PID that is not referred to in this manner, it is not necessary to reconstruct the ES map table in the case of reediting the content, such as trying the authoring operation again, which is advantageous.

(4) Object Data File:

Next, the object data file 140 will be explained.

In this specific embodiment, the object data file 140 stores therein three TS objects as the object data that are actual reproduction objects.

The transport stream defined by the PAT and the PMT described above can be stored as they are or after some processes, as explained with reference to FIG. 9, and the information specifying the elementary stream as being the reproduction object in the transport stream is stored in the above described object information file 130 (refer to FIG. 25). The elementary stream is associated with the entity data in the object data file 140 by the object information file 130.

As explained in detail with reference to FIG. 1 to FIG. 25, according to the embodiment, even if the TS objects 142 are prepared on the basis of different PAT and PMT construction rules, as is a local rule that differs from country to country, and even if the entity data of the TS objects 142 is stored on the optical disc 100 as it is, without changing the structures of the TS objects 142, it is possible to reproduce the information by using the AU information 132I and the PU information 302I, without any problem.

According to the embodiment, it is possible to logically and easily construct the title 200 by the entire data or the one portion of data of the TS object 142 (e.g. the "show 1" only, or further, a certain time band where the "show 1" of the TS #1 object 142 exists and the like as shown with the above described one specific example) or by the title 200 reproduced by connecting a plurality of TS objects 142, which is useful. In addition, by constructing the AU 132, which is a group of the relative elementary streams related to the above, as well as directly pointing out the elementary stream packet ID (ES_PID) by each AU 132, it is possible to easily reproduce the information regardless of the definition contents of the PAT and the PMT of the TS object 142 (i.e. without analyzing the TS object 142 on the basis of the definition rule or the interpretation rule in the information reproducing apparatus or a player), which is prepared in a different broadcast method (which is based on the local rules of Japan and foreign countries). In other words, when storing the transport stream onto the optical disc 100, it is not necessary to reconstruct the PAT and the PMT. As described above, even in the case of recording onto the same optical disc 100 a plurality of TS objects 142, whose PAT and PMT reconstruction rules are not standardized, it is possible to reproduce the multi-vision or multi-view show or program from the transport stream stored on the optical disc 100 without any problem (i.e. freely and appropriately according to a user's desire in the changeable or selectable condition of the vision or the view), which is extremely useful in practice. Therefore, it is possible to easily ensure the interchangeability of the reproduction with a relatively simple player construction.

Moreover, according to the embodiment, by constructing the PU 302 structure in each AU 132, a group of the mutually related elementary streams (e.g. the video stream, the audio stream, and the like) is easily judged at the time of changing the reproduction scenes of the multi-vision title and the like, and the change function of the audio stream in one vision and the like can be realized relatively simply.

According to the embodiment, even in the case of adding a new elementary stream, such as the sub picture stream, to the already prepared TS object 142, it is possible to reconstruct a simple stream that only multiplexes the entire data, by additionally describing the elementary stream packet ID of the simply new elementary stream, the PAT, the PMT, and the like, without changing the elementary stream packet ID (ES_PID) of the existing definition. As described above, the logical structure of the optical disc 100 in the embodiment can simplify the authoring operation for preparing a ROM title, as well as being broadly available for even a household recorder and the like.

In addition, according to the embodiment, since the AU information 132I and the PU information 302I need maintenance only when editing the contents (i.e. it is not necessary to rewrite the PAT and the PMT), it is possible to edit without considering about the PAT or the PMT as being materials, which is extremely useful.

Incidentally, the optical disc 100 as one example of the information recording medium and a recorder or a player related to the optical disc 100 as one example of the information recording/reproducing apparatus are explained in the above described embodiment; however, the present invention is not limited to the optical disc, and the recorder or the player. The present invention is available for the other various information recording/reproducing media corresponding to the high density recording or the high transmission rate, and their recorders or players.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-401618 filed on Dec. 28, 2001 including the specification, claims, drawings and summary is incorporated herein by reference in its entirety.

What is claimed is:

1. An information recording medium on which an entire stream including a plurality of portion streams, each of which comprises picture information or audio information constituting a series of content, is multiplexed-and-recorded by a unit of packet, which is a physically accessible unit, comprising:

an object data file for storing object data, which is a logically accessible unit and is constructed by a plurality of packets, each of which stores therein a segment of the picture information or the audio information;

a reproduction sequence information file for storing reproduction sequence information which defines a reproduction sequence of the object data stored in said object data file;

and an object information file for storing, as reproduction control information for controlling a reproduction of said object data file, (i) correspondence definition information which defines a correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire stream, and (ii) related group definition information which defines, as a related group comprised of certain indexes of the correspondence definition information, a group comprised of certain portion streams having a specific relation from among a plurality of series of contents constituting the plurality of portion streams.

2. The information recording medium according to claim 1, wherein said object information file further stores, as the reproduction control information, sub group definition information which defines as a sub group a group of the plurality of portion streams mutually changeable by an information reproduction apparatus in the related group.

3. The information recording medium according to claim 1, wherein the related group definition information defines such that a same content may commonly belong to two or more groups, each of which is defined as the related group.

4. The information recording medium according to claim 2, wherein the sub group definition information defines such that a same portion stream may commonly belong to two or more groups, each of which is defined as the sub group.

5. The information recording medium according to claim 1, wherein the entire stream includes two or more portion streams each constructed by main picture information which is the series of content as the picture information.

6. The information recording medium according to claim 1, wherein the entire stream includes (i) the portion stream constructed by main picture information which is the series of content as the picture information and (ii) the portion stream constructed by sub picture information which is the series of content as the picture information.

7. The information recording medium according to claim 1, wherein
the entire stream comprises at least one portion of a transport stream of MPEG 2 and
the related group definition information defines as the related group a group having a multi broadcasting relationship from among the plurality of series of contents.

8. The information recording medium according to claim 1, wherein the related group definition information includes what defines as the related group the plurality of series of contents corresponding to one show constructed by a plurality of programs.

9. The information recording medium according to claim 1, wherein the related group definition information includes what defines as the related group the plurality of series of contents corresponding to one show constructed by one program.

10. An information recording apparatus for multiplexing and recording an entire stream by a unit of packet which is a physically accessible unit onto an information recording medium, said entire stream including a plurality of portion streams each of which comprises picture information or audio information constituting a series of content, said apparatus comprising:

a first recording device for recording an object data file, said object data file storing object data, which is a logically accessible unit and is constructed by a plurality of packets, each of which stores therein a segment of the picture information or the audio information;

a second recording device for recording a reproduction sequence information file, said reproduction sequence information file storing reproduction sequence information which defines a reproduction sequence of the object data stored in said object data file; and a third recording device for recording an object information file, said object information file storing, as reproduction control information for controlling a reproduction of said object data file, (i) correspondence definition information which defines a correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire stream, and (ii) related group definition information which defines, as a related group comprised of certain indexes of the correspondence definition information, a group comprised of certain portion streams having a specific relation from among a plurality of series of contents constituting the plurality of portion streams.

11. The information recording apparatus according to claim 10, wherein
a plurality of the packets multiplexed on a time axis include a first packet and a plurality of second packets, the first packet having the predetermined identification data and a first table which stores the identification data of the second packets, each of the second packets having a second table which stores the identification data of certain packets multiplexed on a time axis, whose program numbers are the same as of each second packets, and
the third recording device derives the object information file which stores the reproduction control information from the first table and the second tables, and records the object information file without packetizing nor multiplexing.

12. An information recording method of multiplexing and recording an entire stream by a unit of packet which is a physically accessible unit onto an information recording medium, said entire stream including a plurality of portion streams each of which comprises picture information or audio information constituting a series of content, said method comprising:

a first recording process of recording an object data file, said object data file storing object data, which is a logically accessible unit and is constructed by a plurality of packets, each of which stores therein a segment of the picture information or the audio information;

a second recording process of recording a reproduction sequence information file, said reproduction sequence information file storing reproduction sequence information which defines a reproduction sequence of the object data stored in said object data file;

and a third recording process of recording an object information file, said object information file storing, as reproduction control information for controlling a reproduction of said object data file, (i) correspondence definition information which defines a correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire steam, and (ii) related group definition information which defines, as a related group comprised of certain indexes of the correspondence definition information, a group comprised of certain portion streams having a specific relation from among a plurality of series of contents constituting the plurality of portion streams.

13. The information recording method according to claim 12, wherein a plurality of the packets multiplexed on a time axis include a first packet and a plurality of second packets, the first packet having the predetermined identification data and a first table which stores the identification data of the second packets, each of the second packets having a second table which stores the identification data of certain packets multiplexed on a time axis, whose program numbers are the same as of each second packets, and the third recording device derives the object information file which stores the reproduction control information from the first table and the second tables, and records the object information file without packetizing nor multiplexing.

14. An information reproducing apparatus for reproducing information recorded on an information recording medium on which an entire stream including a plurality of portion streams, each of which comprises picture information or audio information constituting a series of content, is multiplexed-and-recorded by a unit of packet, which is a physically accessible unit, the information recording medium comprising:

an object data file for storing object data, which is a logically accessible unit and is constructed by a plurality of packets, each of which stores therein a segment of the picture information or the audio information;

a reproduction sequence information file for storing reproduction sequence information which defines a reproduction sequence of the object data stored in said object data file;

and an object information file for storing, as reproduction control information for controlling a reproduction of said object data file, (i) correspondence definition information which defines a correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire stream, and (ii) related group definition information which defines, as a related group comprised of certain indexes of the correspondence definition information, a group comprised of certain portion streams having a specific relation from among a plurality of series of contents constituting the plurality of portion streams, said information reproducing apparatus comprising:

a reading device for physically reading the information from the information recording medium; and a reproducing device for reproducing the object data included in the information read by said reading device, on the basis of the reproduction control information and the reproduction sequence information included in the information read by said reading device.

15. An information reproducing method of reproducing information recorded on an information recording medium on which an entire stream including a plurality of portion streams, each of which comprises picture information or audio information constituting a series of content, is multiplexed-and-recorded by a unit of packet, which is a physically accessible unit, the information recording medium comprising:

an object data file for storing object data, which is a logically accessible unit and is constructed by a plurality of packets, each of which stores therein a segment of the picture information or the audio information;

a reproduction sequence information file for storing reproduction sequence information which defines a reproduction sequence of the object data stored in said object data file;

and an object information file for storing, as reproduction control information for controlling a reproduction of said object data file, (i) correspondence definition information which defines a correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire stream, and (ii) related group definition information which defines, as a related group comprised of certain indexes of the correspondence definition information, a group comprised of certain portion streams having a specific relation from among a plurality of series of contents constituting the plurality of portion streams, said information reproducing method comprising:

a reading process of physically reading the information from the information recording medium;

and a reproducing process of reproducing the object data included in the information read by said reading process, on the basis of the reproduction control information and the reproduction sequence information included in the information read by said reading process.

16. An information recording and reproducing apparatus for multiplexing and recording an entire stream by a unit of packet which is a physically accessible unit onto an information recording medium, said entire stream including a plurality of portion streams each of which comprises picture information or audio information constituting a series of content, and for reproducing information recorded on the information recording medium, the information recording medium comprising:

an object data file for storing object data, which is a logically accessible unit and is constructed by a plurality of packets, each of which stores therein a segment of the picture information or the audio information;

a reproduction sequence information file for storing reproduction sequence information which defines a reproduction sequence of the object data stored in said object data file;

and an object information file for storing, as reproduction control information for controlling a reproduction of said object data file, (i) correspondence definition information which defines a correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire stream, and (ii) related group definition information which defines, as a related group comprised of certain indexes of the correspondence definition information, a group comprised of certain portion streams having a specific relation from among a plurality of series of contents constituting the plurality of portion streams, said information recording and reproducing apparatus comprising:

a first recording device for recording the object data file onto the information recording medium;

a second recording device for recording the reproduction sequence information file onto the information recording medium;

a third recording device for recording the object information file onto the information recording medium;

a reading device for physically reading the information from the information recording medium;

and a reproducing device for reproducing the object data included in the information read by said reading device, on the basis of the reproduction control information and the reproduction sequence information included in the information read by said reading device.

17. An information recording and reproducing method of multiplexing and recording an entire stream by a unit of packet which is a physically accessible unit onto an information recording medium, said entire stream including a plurality of portion streams each of which comprises picture information or audio information constituting a series of content, and of reproducing information recorded on the information recording medium, the information recording medium comprising:

an object data file for storing object data, which is a logically accessible unit and is constructed by a plurality of packets, each of which stores therein a segment of the picture information or the audio information;

a reproduction sequence information file for storing reproduction sequence information which defines a reproduction sequence of the object data stored in said object data file;

and an object information file for storing, as reproduction control information for controlling a reproduction of said object data file, (i) correspondence definition information which defining correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire stream, and (ii) related group definition information which defines, as a related group comprised of certain indexes of the correspondence definition information, a group comprised of certain portion streams having a specific relation from among a plurality of series of contents constituting the plurality of portion streams, said information recording and reproducing method comprising:

a first recording process of recording the object data file onto the information recording medium;

a second recording process of recording the reproduction sequence information file onto the information recording medium;

a third recording process of recording the object information file onto the information recording medium;

a reading process of physically reading the information from the information recording medium;

and a reproducing process of reproducing the object data included in the information read by said reading process, on the basis of the reproduction control information and the reproduction sequence information included in the information read by said reading process.

18. A computer-readable medium tangibly embodying a program of instructions executable by the computer to perform method processes of multiplexing and recording an entire stream by a unit of packet which is a physically accessible unit onto an information recording medium, said entire stream including a plurality of portion streams each of which comprises picture information or audio information constituting a series of content, said method processes comprising:

a first recording process of recording an object data file, said object data file storing object data, which is a logically accessible unit and is constructed by a plurality of packets, each of which stores therein a segment of the picture information or the audio information;

a second recording process of recording a reproduction sequence information file, said reproduction sequence information file storing reproduction sequence information which defines a reproduction sequence of the object data stored in said object data file;

and a third recording process of recording an object information file, said object information file storing, as reproduction control information for controlling a reproduction of said object data file, (i) correspondence definition information which defines a correspondence relationship between identification data and address information on the information recording medium of each packet, the identification data including a program number for specifying certain one of the plurality of portion streams which are comprised of a plurality of packets multiplexed on a time axis, each correspondence relationship being given a unique index among the entire streams, and (ii) related group definition information which defines, as a related group comprised of certain indexes of the correspondence definition information, a group comprised of certain portion streams having a specific relation from among a plurality of series of contents constituting the plurality of portion streams.

* * * * *